US012043709B2

(12) United States Patent
Richardson et al.

(10) Patent No.: US 12,043,709 B2
(45) Date of Patent: *Jul. 23, 2024

(54) COMPOSITES WITH THERMOPLASTIC EPOXY POLYMERIC PHASE, ARTICLES SUCH AS CARRIERS MADE THEREWITH AND ASSOCIATED METHODS

(71) Applicant: ZEPHYROS, INC., Romeo, MI (US)

(72) Inventors: Henry E. Richardson, Washington, MI (US); Sylvain Gleyal, Rochester, MI (US)

(73) Assignee: ZEPHYROS, INC., Romeo, MI (US)

( * ) Notice: Subject to any disclaimer, the term of this patent is extended or adjusted under 35 U.S.C. 154(b) by 6 days.

This patent is subject to a terminal disclaimer.

(21) Appl. No.: 17/569,082

(22) Filed: Jan. 5, 2022

(65) Prior Publication Data

US 2022/0127426 A1 Apr. 28, 2022

Related U.S. Application Data

(63) Continuation of application No. 16/798,971, filed on Feb. 24, 2020, now Pat. No. 11,248,096, which is a
(Continued)

(51) Int. Cl.
*C08J 5/04* (2006.01)
*B29C 44/02* (2006.01)
(Continued)

(52) U.S. Cl.
CPC ............... *C08J 5/04* (2013.01); *B29C 44/02* (2013.01); *B29C 44/188* (2013.01);
(Continued)

(58) Field of Classification Search
CPC ... F23M 9/00; F23M 9/04; B29L 31/30; C08J 2363/00; C08J 2363/02; C08J 5/04;
(Continued)

(56) References Cited

U.S. PATENT DOCUMENTS 3,317,471 A 5/1967 Johnson et al.
4,438,254 A 3/1984 Doorakian et al.
(Continued)

FOREIGN PATENT DOCUMENTS

CN 101578430 A 11/2009
CN 102952372 A 3/2013
(Continued)

OTHER PUBLICATIONS

Sukanto et al., Epoxy resins thermosetting for mechanical engineering, Open Engineering, Jan. 2021.*
(Continued)

*Primary Examiner* — Camie S Thompson
(74) *Attorney, Agent, or Firm* — The Dobrusin Law Firm, P.C.

(57) ABSTRACT

A structural reinforcement for an article including a carrier (10) that includes: (i) a mass of polymeric material (12) having an outer surface; and (ii) at least one fibrous composite Insert (14) or overlay (980) having an outer surface and including at least one elongated fiber arrangement (e.g., having a plurality of ordered fibers). The fibrous Insert (14) or overlay (980) is envisioned to adjoin the mass of the polymeric material in a predetermined location for carrying a predetermined load that Is subjected upon the predetermined location (thereby effectively providing localized reinforcement to that predetermined location). The fibrous insert (14) or overlay (980) and the mass of polymeric material (12) are of compatible materials, structures or both, for allowing the fibrous insert or overlay to be at feast partially joined to the mass of the polymeric material. Disposed upon at least a portion of the carrier (10) may be a mass of activatable material (126). The fibrous insert (14) or overlay (980) may include a polymeric matrix that includes a thermoplastic epoxy.

19 Claims, 6 Drawing Sheets

Related U.S. Application Data continuation of application No. 15/556,419, filed as application No. PCT/US2016/021721 on Mar. 10, 2016, now Pat. No. 10,570,258.

(60) Provisional application No. 62/296,374, filed on Feb. 17, 2016, provisional application No. 62/294,160, filed on Feb. 11, 2016, provisional application No. 62/183,380, filed on Jun. 23, 2015, provisional application No. 62/130,832, filed on Mar. 10, 2015.

(51) Int. Cl.
| | |
|---|---|
| B29C 44/18 | (2006.01) |
| B29C 44/34 | (2006.01) |
| B29K 101/12 | (2006.01) |
| B29K 105/06 | (2006.01) |
| B29K 105/12 | (2006.01) |
| B29K 505/00 | (2006.01) |
| B29K 507/04 | (2006.01) |
| B29K 511/10 | (2006.01) |
| B29L 31/30 | (2006.01) |
| B62D 29/00 | (2006.01) |
| B62D 29/04 | (2006.01) |
| C08K 7/00 | (2006.01) |
| C08K 7/02 | (2006.01) |

(52) U.S. Cl.
CPC ............ *B29C 44/3484* (2013.01); *C08K 7/00* (2013.01); *C08K 7/02* (2013.01); *B29K 2101/12* (2013.01); *B29K 2105/06* (2013.01); *B29K 2105/12* (2013.01); *B29K 2105/128* (2013.01); *B29K 2505/00* (2013.01); *B29K 2507/04* (2013.01); *B29K 2511/10* (2013.01); *B29L 2031/30* (2013.01); *B29L 2031/3002* (2013.01); *B62D 29/002* (2013.01); *B62D 29/04* (2013.01); *C08J 2363/00* (2013.01); *C08J 2363/02* (2013.01); *C08K 2201/004* (2013.01)

(58) Field of Classification Search
CPC ........ C08J 5/043; B62D 29/002; B62D 29/04; B29K 2101/12; B29K 2105/06; B29K 2105/12; B29K 2105/128; B29K 2507/04; B29K 2511/10; B29C 44/02; C08L 63/00; C08K 7/00; C08K 7/02
USPC ............ 428/299.7, 297.4, 407; 525/240, 88; 264/257, 271.1; 528/103; 522/170
See application file for complete search history.

(56) References Cited

U.S. PATENT DOCUMENTS

| | | | |
|---|---|---|---|
| 4,501,856 A | 2/1985 | Harpell | |
| 4,647,648 A | 3/1987 | Silvis et al. | |
| 4,664,738 A * | 5/1987 | Tadros ................. | B32B 27/322 156/290 |
| 5,115,075 A | 5/1992 | Brennan et al. | |
| 5,164,472 A | 11/1992 | White et al. | |
| 5,275,853 A | 1/1994 | Silvis et al. | |
| 5,401,814 A | 3/1995 | Schomaker et al. | |
| 5,464,924 A | 11/1995 | Silvis et al. | |
| 5,741,042 A | 4/1998 | Livingston et al. | |
| 6,011,111 A | 1/2000 | Brennan et al. | |
| 6,855,652 B2 | 2/2005 | Hable et al. | |
| 7,125,461 B2 | 10/2006 | Czaplicki et al. | |
| 7,318,873 B2 | 1/2008 | Czaplicki et al. | |
| 7,581,932 B2 | 9/2009 | Coupe et al. | |
| 7,784,186 B2 | 8/2010 | White et al. | |
| 7,892,396 B2 | 2/2011 | Sheasley | |
| 8,430,448 B2 | 4/2013 | Richardson et al. | |
| 10,570,258 B2 | 2/2020 | Richardson | |
| 11,110,670 B2 | 9/2021 | Richardson et al. | |
| 11,248,096 B2 * | 2/2022 | Richardson ............... | C08K 7/00 |
| 2002/0009937 A1 | 1/2002 | Dukes | |
| 2003/0039792 A1 | 2/2003 | Hable et al. | |
| 2007/0090560 A1 | 4/2007 | Kassa | |
| 2007/0270515 A1 | 11/2007 | Chmielewski et al. | |
| 2009/0202294 A1 | 8/2009 | Apfel | |
| 2009/0258217 A1 | 10/2009 | Hoefflin | |
| 2009/0298974 A1 | 12/2009 | Chmielewski et al. | |
| 2010/0289242 A1 | 11/2010 | Nitsche et al. | |
| 2011/0039470 A1 | 2/2011 | Wakeman et al. | |
| 2011/0278802 A1 | 11/2011 | Nitsche et al. | |
| 2012/0251863 A1 | 10/2012 | Berger et al. | |
| 2013/0020019 A1 | 1/2013 | Nogues et al. | |
| 2015/0129116 A1 | 5/2015 | Richeton et al. | |
| 2015/0165737 A1 | 6/2015 | Richardson et al. | |
| 2016/0046047 A1 | 2/2016 | Gleyal et al. | |
| 2016/0273160 A1 * | 9/2016 | Braymand .......... | B29C 45/1671 |
| 2017/0247821 A1 | 8/2017 | Siboni et al. | |
| 2018/0036970 A1 | 2/2018 | Chmielewski et al. | |
| 2020/0157293 A1 | 5/2020 | Chmielewski et al. | |
| 2021/0053625 A1 | 2/2021 | Richardson | |
| 2021/0237377 A1 | 8/2021 | Richardson | |
| 2022/0080912 A1 | 3/2022 | Barz | |
| 2022/0097776 A1 | 3/2022 | Royston | |

FOREIGN PATENT DOCUMENTS

| | | |
|---|---|---|
| EP | 2154052 A1 | 2/2010 |
| WO | 98/14498 A1 | 4/1998 |
| WO | 2007/008569 A1 | 1/2007 |
| WO | 2007/117663 A2 | 10/2007 |
| WO | 2008/010823 A2 | 1/2008 |
| WO | 2009/127638 A1 | 10/2009 |
| WO | 2010/054194 A1 | 5/2010 |
| WO | 2015/061291 A1 | 4/2015 |
| WO | 2015/095325 A1 | 6/2015 |
| WO | 2020/198139 A1 | 10/2020 |
| WO | 2020/205192 A1 | 10/2020 |
| WO | 2020/214769 A1 | 10/2020 |
| WO | 2021/080917 A1 | 4/2021 |

OTHER PUBLICATIONS

International Search Report and Written Opinion from the European Patent Office for Application No. PCT/US2016/021721, mailed Aug. 16, 2016.
Potentially related copending U.S. Appl. No. 15/555,999, filed Sep. 6, 2017, published as US 2018/0036970 on Feb. 8, 2018.
Indian Intellectual Property Examination Report for Application No. 201717031946, mailed Jun. 1, 2020.

* cited by examiner

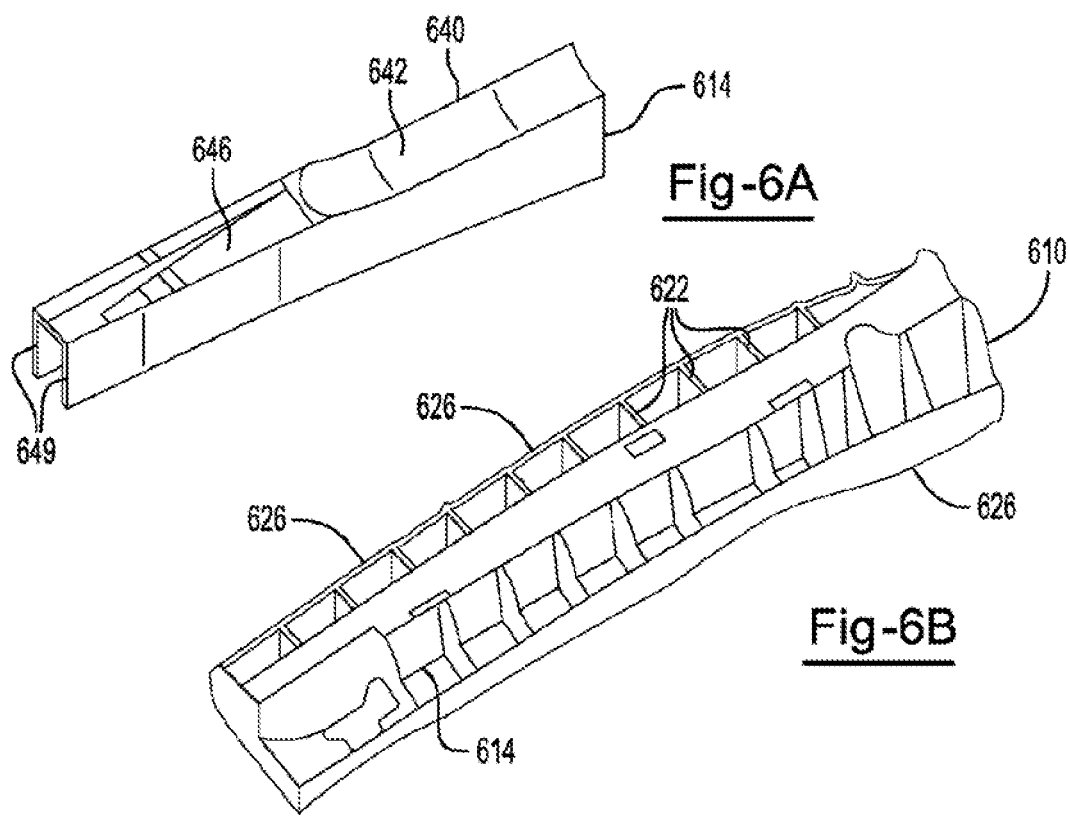
Fig-6A
Fig-6B
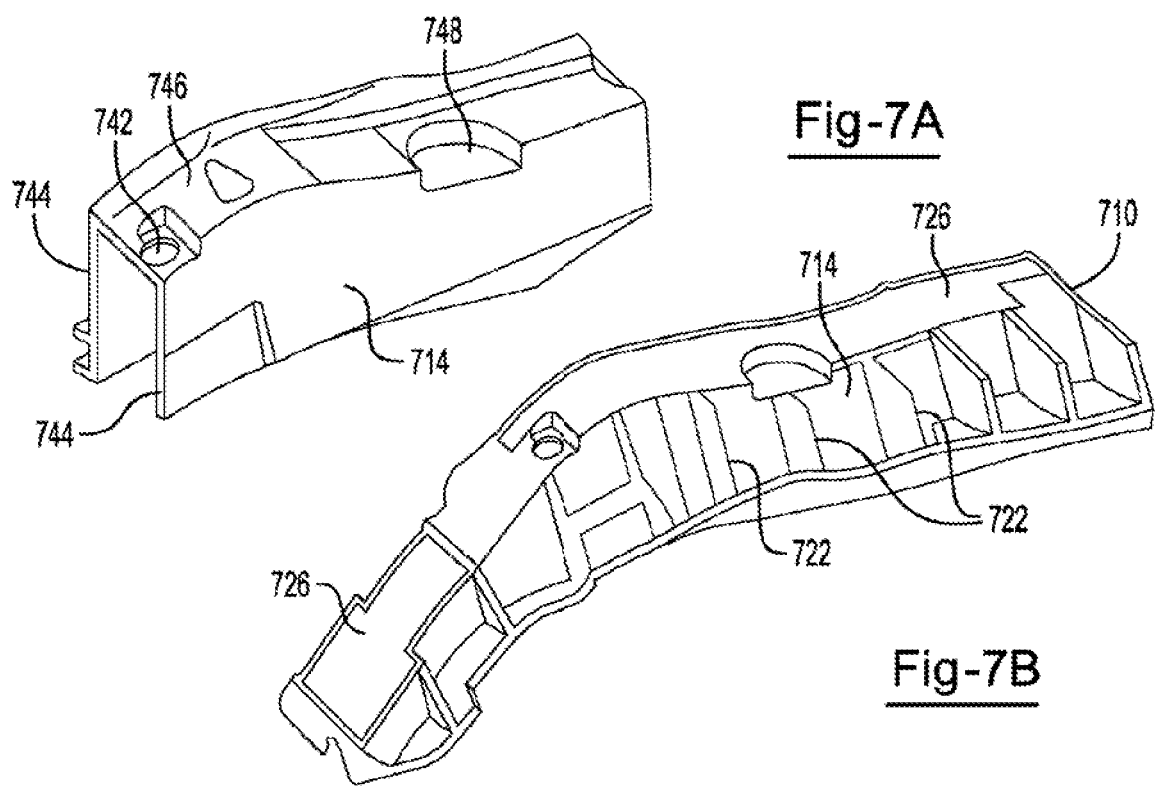
Fig-7A
Fig-7B

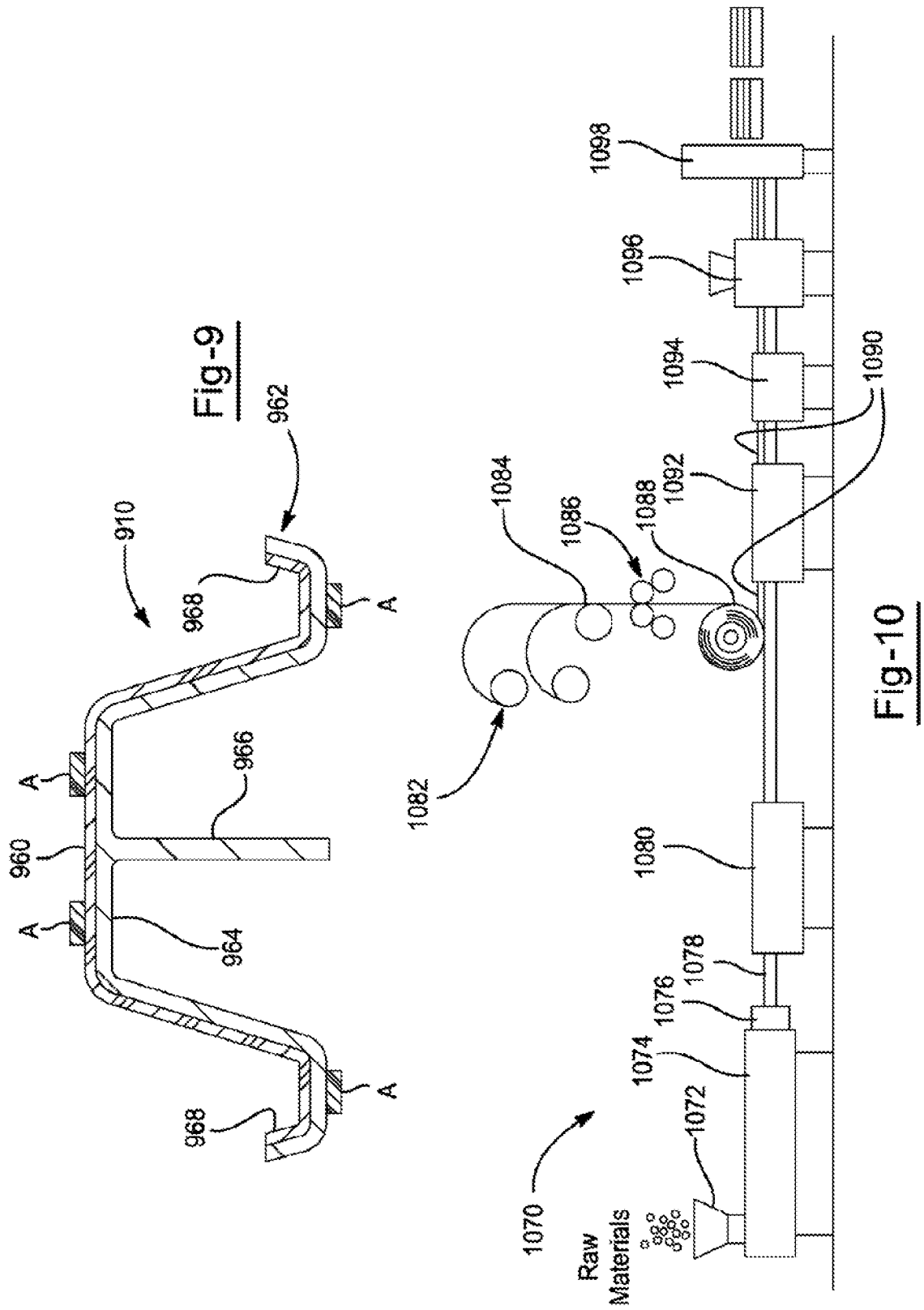

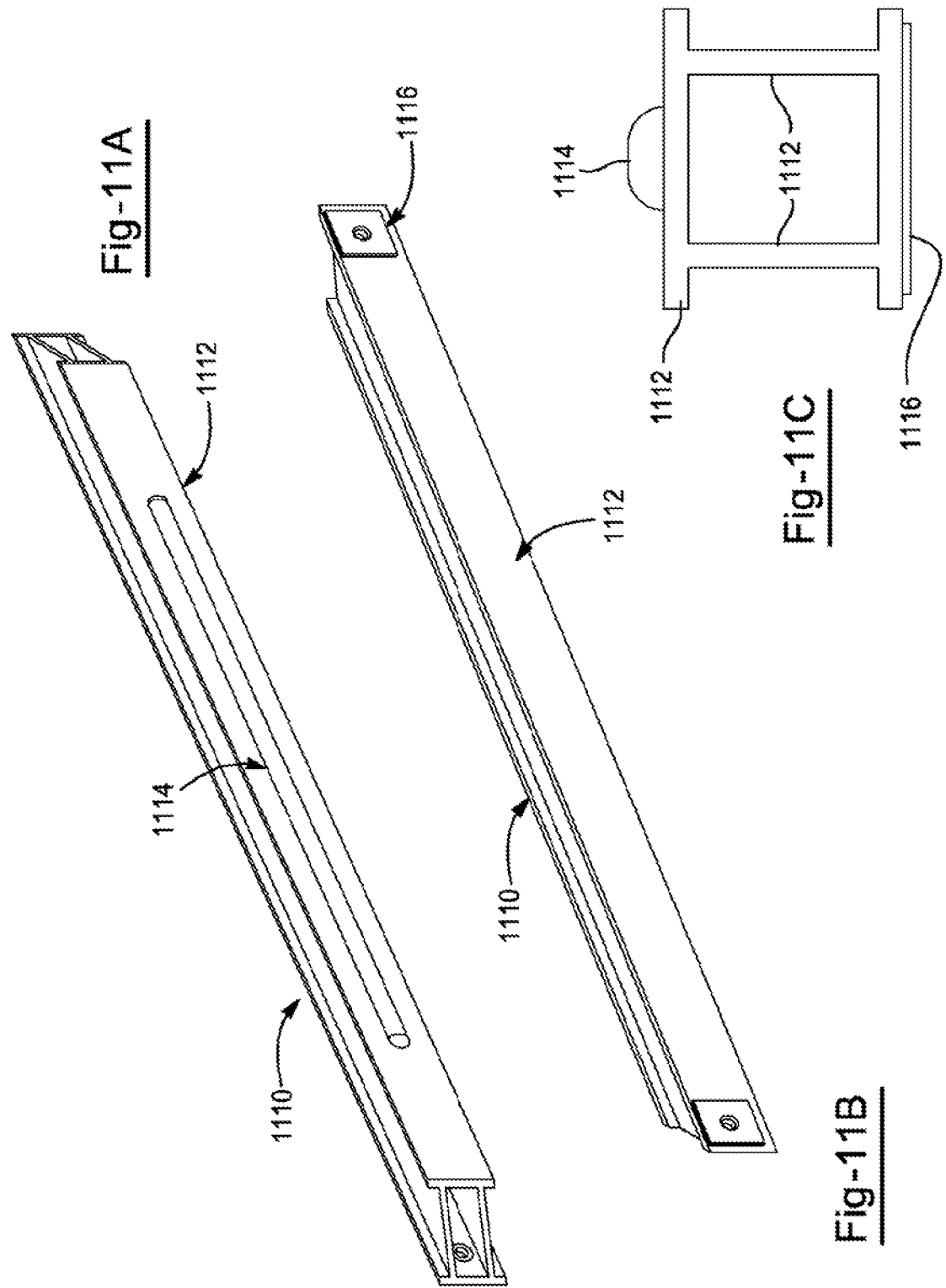

COMPOSITES WITH THERMOPLASTIC EPOXY POLYMERIC PHASE, ARTICLES SUCH AS CARRIERS MADE THEREWITH AND ASSOCIATED METHODS

TECHNICAL FIELD

The present invention relates generally to composite materials, particularly to composites having a thermoplastic epoxy polymer phase, which can be employed in a number of applications, such as in structural reinforcements and/or baffles for use in transportation vehicles.

BACKGROUND

There is an ongoing effort in many industries to lighten the weight of articles, in many instances, this is achieved by the selection of materials that have a lower density, thinner section thicknesses or both, as compared with prior materials or structures. As a result, there is a potential for the weakening of structures, and the consequent need for stiffening or other structural reinforcement.

In the field of automotive vehicle manufacturing it is common to employ structural reinforcements within cavities of the vehicle body structure. For instance, it has become common to employ within a cavity of the vehicle body structure a relatively rigid molded polymeric carrier that carries an activatable material on one or more of its outer surfaces. For certain activatable materials, upon being activated (e.g., by the heat from a coating bake oven), the activatable material can expand and bond to a surface defining the cavity.

In order to selectively control the properties of the article reinforcement structure, it has been taught to use hybrid reinforcement structures that include a combination of multiple materials for the carrier. See, e.g., U.S. Pat. No. 8,430,448, hereby expressly incorporated by reference for all purposes. See also, Patent Cooperation Treaty (PCT) Application No. WO 2010/054194, hereby expressly incorporated by reference for all purposes.

In the automotive vehicle industry, the use of computer modeling (e.g., finite element analysis) has been employed for simulating a vehicle crash, and for modeling how a particular section of a vehicle will respond to the crash. Such modeling can be utilized to determine appropriate locations for the placement of reinforcing structures.

Notwithstanding the above efforts there remains a need for alternative carrier structures. For example, there remains a need for alternative carrier structures that employ a combination of different materials that, even though they are dissimilar, are still generally compatible (e.g., chemically and/or physically compatible) with each other so that they can be joined together without the need for an adhesive, a mechanical fastener, or other means for physically joining two or more different materials. There also remains an ongoing need for alternative carrier structures that employ a combination of different materials that each contains a substantial polymeric portion (e.g., a non-metallic portion) so that weight savings can be attained. There is also a need for polymeric materials that can be combined to increase the overall modulus and flexural strength of a reinforcement, such that it exceeds that of any of the materials on their own. There also remains an ongoing need for alternative carrier structures that employ a combination of different materials that join together at an interface region that is generally continuous with the portions of the carrier defined by the different respective materials. There also remains an ongoing need for an alternative carrier that can employ one or more localized reinforcement regions by use of a particular material within the carrier, and which may be achieved in the absence of a need for a structural feature (e.g., a rib) for imparting additional strength to the localized reinforcement.

Examples of composite structures are illustrated in PCT Publication No. WO2007/008563, United States Published Patent Application Nos. 2011/0039470 and 2012/0251863, and U.S. Pat. No. 7,581,932 all incorporated by reference for all purposes. See also, U.S. Pat. Nos. 6,855,652, 7,125,461 and 7,318,873, and United States Published Patent Application Nos. 2003/0039792, 2010/0289242, 2011/0278802, and 2009/0202294, incorporated by reference for all purposes.

The present application also is related to and incorporates by reference for all purposes Great Britain Patent Application No. 1318595.4, filed Oct. 21, 2013.

Further to the above, thermoplastic polymers having at least one epoxide group have been described in U.S. Pat. Nos. 5,115,075; 4,438,254; 6,011,111; and PCT Publication No. WO98/14498 (see e.g., pages 3-8) along with illustrative synthesis conditions, all incorporated by reference herein (see also U.S. Pat. Nos. 3,317,471 and 4,847,648, also incorporated by reference herein). Examples of such materials also can be found, without limitation at paragraphs 15-25 of Published U.S. Patent Application No. 2007/0270515 (Chmielewski et al), incorporated by reference for all purposes.

The use of such thermoplastic polymers in a composite material has been disclosed in PCT Publication No. WO/2008/010823 (addressing in situ reaction of an epoxy and an amine after impregnation), incorporated by reference herein. Notwithstanding the above, there remains a need for alternative composite materials. For example, there remains a need for composite materials that are suitable for use in a carrier for a baffle and/or structural reinforcement for a transportation vehicle of a type exemplified in the above discussed patent publications. For example, in instances where it may be desirable to locally alter or improve a property of a carrier material there remains a need for alternative materials suitable for such purpose. There also remains a need for materials that allow for recycling, reclamation and/or re-use beyond the useful life of the material in its intended application. See also, United States Patent Application No. 2009/0298974 (incorporated by reference).

SUMMARY OF THE INVENTION

One or more of the above needs are met by the present teachings which contemplate improved structures and methods that can be employed advantageously for sealing, baffling and/or structurally reinforcing various articles, and particularly for structurally reinforcing transportation vehicles, such as automotive vehicles. The materials of the present teachings also find application in a number of other applications as will be gleaned from the following discussion. That is, the present teachings relate generally to composite materials. As one example, the present teachings relate to fibrous composite materials that employ a distributed phase (e.g., a fibrous phase) and a thermoplastic polymeric material having at least one epoxide group. The material offers the benefit of mechanical properties typically achieved through the use of thermoset polymeric materials (e.g., a thermoset epoxy material) as some or all of a matrix phase of a composite. However, the material has a number of physical attributes that make it suitable for handling, processing and/or post-useful life reclamation, recycling, and/or re-use.

The teachings herein relate to a composite article. The composite article may be in a form suitable for use as part of a baffle and/or structural reinforcement for a transportation vehicle. The composite article may include at least two phases. For example, it may include a distributed phase and a matrix phase within which the distributed phase is distributed. The distributed phase in the composite article may include a plurality of segmented forms selected from fibers, platelets, flakes, whiskers, or any combination thereof. The polymeric matrix in the composite article in which the distributed phase is distributed may include at least about 25% by weight of the polymeric matrix of a substantially thermoplastic polymer having at least one epoxide functional group. The composite article may be substantially free of a distributed phase.

The teachings herein also relate to a method for making a composite article. In general, a method in accordance with the present teachings may employ a step of contacting a plurality of segmented forms provided for defining a distributed phase with a thermoplastic epoxy resin, such as an hydroxy-phenoxyether polymer (e.g., a generally thermoplastic reaction product of an epoxy and an amine) that is in a softened state (e.g., in a liquefied molten state). For instance, a method in accordance with the present teachings may employ forming a composite material by extrusion, injection molding, pultrusion, or a combination of such processes. Thus, it is envisioned for the teachings herein that there is method of making the composite article that includes contacting an epoxy/amine reaction product material during a step of extrusion, injection molding, pultrusion or any combination thereof. The contacting may be only after the reaction has completed between the epoxy and the amine (e.g., only after the reaction of epoxy and amine). Thus it is possible that the method herein will involve no chemical reaction between any epoxy and amine reactants that occurs within an injection molding machine and/or an extruder. That is, the method may include advancing a thermoplastic polymer having at least one epoxide functional group reaction product along a rotating feed screw within a barrel of a polymeric material shaping apparatus.

Composites that are made in accordance with the present teachings can be employed as some or all of a consolidated fibrous composite material insert and/or overlay. The fibrous material composites herein may include a distributed phase and a matrix phase, wherein the distributed phase includes at least one elongated fiber arrangement in order to define a consolidated fibrous insert for a carrier. The carrier, the consolidated fibrous insert and/or overlay, or each may have an outer surface. The composite, the insert and/or overlay, or each may include at least one elongated fiber arrangement having a plurality of ordered fibers (e.g., organic and/or inorganic fibers) that may be distributed in a predetermined manner in a polymeric material matrix. The polymeric material matrix may include a thermoplastic epoxy resin material as described generally, or as described in any of the particular illustrative materials herein. The composites of the present teachings may be employed alone for defining a carrier for the baffles and/or structural reinforcements of the present teachings. The composites of the present teachings may be employed as a fibrous insert adjoining (e.g., in a manner to achieve as a continuous outer surface) a mass of the polymeric malarial (e.g., one that includes a polyamide such as Nylon, Nylon 6, Nylon 66, poly-butylene terephthalate, or any combination thereof, optionally being glass filled) for defining such a carrier. The location, size, shape or any combination thereof, of the fibrous insert may be selected to help improve one or more properties of the carrier in the region where the insert is located. The carrier may carry an activatable material over at least a portion of the outer surface of the carrier. For example, the activatable material may be activated by heat (e.g., heat from a paint bake oven, such as an automotive paint bake oven, or by induction heating) to foam, expand, adhere and/or cure.

The teachings herein further provide for composites comprising a mass of polymeric material having an outer surface and including a first polymeric material, at least one fibrous material overlay having an outer surface and including at least one elongated fiber arrangement having a plurality of ordered fibers, the at least one fibrous insert; and a second polymeric material layer located in between and in direct planar contact with each of the mass of polymeric material and at least one fibrous material overlay, wherein the second polymeric material is a hydroxy-phenoxyether polymer, such as a polyetheramine thermoplastic material, which is a product (e.g., a thermoplastic condensation reaction product) of a reaction of a mono-functional or di-functional species (e.g., monoethanolamine) with an epoxide-containing moiety, such as a diepoxide (e.g., diglycidyl ether bisphenol A) reacted under conditions for causing the hydroxyl moieties to read with the epoxy moieties to form a generally linear backbone polymer chain with ether linkages.

The composite may include a single mass of polymeric material, which may be a polyethylene material. The composite may include exactly two fibrous material overlays. The composite may include at least two second polymeric layers. The composite may include at least four second polymeric layers. The composite may include exactly four second polymeric layers. The second polymeric layer may be a film. The mass of polymeric material may include a polyethylene material. The at least one fibrous material overlay may include glass fibers.

The teachings herein also provide for a method comprising forming the composites described herein in a heated press.

The teachings herein further provide for a device comprising an elongated pultruded reformable thermoplastic epoxy carrier, a sealant material located into direct planar contact with a portion of the carrier, and one or more reformable thermoplastic epoxy film layer portions located in direct planar contact with the carrier.

BRIEF DESCRIPTION OF THE DRAWINGS

FIG. 4a is a top perspective view of one illustrative carrier in accordance with the present teachings.

FIG. 4b is a bottom perspective view of the carrier of FIG. 4a.

FIG. 6a is a perspective view of an illustrative fibrous insert in accordance with the present teachings.

FIG. 6b is a perspective view of an illustrative part incorporating the fibrous insert of FIG. 6a.

FIG. 7a is a perspective view of another illustrative fibrous insert in accordance with the present teachings.

FIG. 7b is a perspective view of an illustrative part incorporating the fibrous insert of FIG. 6a.

FIG. 9 is an illustrative example of a profile of an elongated article (e.g., a carrier) having an illustrative overlay in accordance with the present teachings.

FIG. 10 is a schematic of a system for making an article in accordance with the present teachings.

FIG. 11A is a perspective view of an illustrative article in accordance with the present teachings.

FIG. 11B is a rear perspective view of the article of FIG. 11A.

FIG. 11C is a side profile view of the article of FIG. 11A.

DETAILED DESCRIPTION

Figure 1:
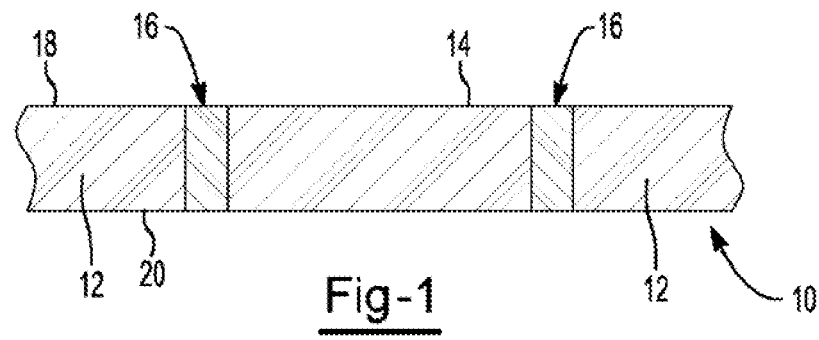
FIG. 1 is a side sectional view of a portion of one illustrative part in accordance with the present teachings.

The present teachings meet one or more of the above needs by the improved devices and methods described herein. The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the fun scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present application is related to the teachings of PCT Application No. PCT/US14/070853, filed Dec. 17, 2014; U.S. Provisional Application Ser. No. 61/916,884, filed on Dec. 17, 2013; and PCT Application No. PCT/US14/61531, filed Oct. 21, 2014, the contents of these applications being hereby incorporated by reference for aft purposes.

This application claims the benefit of the filing dates of U.S. Provisional Application Ser. No. 62/130,832, filed Mar. 10, 2015; U.S. Provisional Application Ser. No. 62/183,380, filed Jun. 23, 2015; U.S. Provisional Application Ser. No. 62/294,160, filed Feb. 11, 2018; and U.S. Provisional Application Ser. No. 62/296,374, filed Feb. 17, 2016; all of which are incorporated by reference for all purposes.

As noted, the present teachings relate generally to composite materials. In this regard, there are various composites to which the teachings pertain. The composites share the common characteristic that they each employ a fibrous composite material. The fibrous composite material may have a distributed phase (e.g., a fibrous phase) and a thermoplastic polymeric material (e.g., a reformable resin material or thermoplastic reaction product) having at least one epoxide group. The thermoplastic polymeric material having at least one epoxide group may define a matrix material in which the distributed phase resides. The thermoplastic polymeric material having at least one epoxide group may be hydroxy-phenoxyether polymer, such as a polyetheramine thermoplastic material as described herein. For example, such thermoplastic polymeric material having at least one epoxide group may be a product (e.g., a thermoplastic condensation reaction product) of a reaction of a mono-functional or di-functional species (i.e., respectively, a species having one or two reactive groups, such as an amide containing species), with an epoxide-containing moiety, such as a diepoxide (i.e., a compound having two epoxide functionalities), reacted under conditions for causing the hydroxyl moieties to react with the epoxy moieties to form a generally linear backbone polymer chain with ether linkages. The reformable thermoplastic polymeric material may be formed as a sheet or film and may be substantially free of any distributed (e.g., fibrous) phase, in one non-limiting example, the thermoplastic polymeric material may be formed as a film which may be in contact with a fibrous layer. The reformable thermoplastic polymeric material may be formed as a yarn.

The teachings contemplate the possibility that a structure may be fabricated using a reformable thermoplastic material in accordance with the teachings generally herein. In particular, the structure may be made from a thermoplastic material in accordance with the present teachings that is reinforced with a reinforcement phase. The reinforcement phase may be distributed in a matrix of the thermoplastic material (e.g., a polyamide as described and/or a reformable resin material as described). For example, the reinforcement phase may be at least a majority (by volume) of the total material. It may be greater than about 60% by volume or greater than about 70% by volume. It may be below about 90% by volume, below about 80% by volume, or below about 70% by volume. Any reinforcement phase may be distributed randomly, generally uniformly, and/or in one or more predetermined locations of an article. The reinforcement phase may comprise the reformable thermoplastic material.

The fibrous composite materials may be employed as a portion of another composite material. For example it may be employed as an insert (e.g., a fibrous insert) and/or an overlay (e.g. sheet) of a composite that includes one or more other materials.

The teachings herein relate to a composite article. The composite article may be in a form suitable for use as part of a baffle and/or structural reinforcement for a transportation vehicle. The composite article may be in a form suitable for use as a panel structure. The composite article may be in a form suitable for use as a building construction material, as a furniture material, aa a sporting good material (e.g., for skis, snowboards, bicycles, bats, tennis rackets or the like) or as protective gear material (e.g., for police shields, armored vehicle panels, or the like). The fibrous composite materials of any composite article herein may include a single phase or may include at least two phases. For example, it may include a distributed phase and a matrix phase within which the distributed phase is distributed. The distributed phase in the composite article may include a plurality of elongated (e.g., in a ratio of at least 2:1 as between a major and minor dimension of the form) segmented forms selected from fibers, platelets, flakes, whiskers, or any combination thereof. For fibers employed herein, the fibers may be employed in the distributed phase is in the form of a random distribution, a weave, a non-woven mat, a plurality of generally axially aligned fibers (e.g., a tow), a plurality of axially intertwined fibers (e.g., a yarn) or any combination thereof. A plurality of individual fibers may thus be in a generally ordered relationship (e.g., according to a predetermined pattern) relative to each other.

The composition of material of the distributed phase may be the same as or different from the composition of the polymeric matrix. For example, it is possible that material of the distributed phase may be a thermoplastic polymer having at least one epoxide functional group as described generally or specifically within the teachings herein. The polymeric matrix material may also be or include a thermoplastic polymer having at least one epoxide functional group as described generally or specifically within the teachings herein.

The ratio by weight of polymeric matrix to the distributed phase may be range from about 1:10 to about 100:1 (e.g., it may range from about 1:5 to about 10:1, about 1:3 to about 5:1, about 1:2 to about 2:1).

The polymeric matrix in the fibrous composite material in which the distributed phase is distributed may include at least about 25%, 33%, 50%, 67%, 85% by weight of the polymeric matrix of a substantially thermoplastic polymer having at least one epoxide functional group. The polymeric matrix of the substantially thermoplastic polymer having at least one epoxide functional group may have less than about 5%, 3%, or even 1% by weight of a polymeric ingredient other than the thermoplastic polymer having at least one epoxide functional group (e.g., the polymeric matrix consists essentially of the thermoplastic polymer having at least one epoxide functional group).

The balance of the material of the fibrous composite material may be the distributed phase. The balance of the material of the composite material may include the distributed phase in addition to another phase and/or material.

The distributed phase may include one, two or more different materials. For instance it may include a single form (e.g., a single elongated segment form), or a plurality of different forms (e.g., a plurality of elongated segment forms). At least about 25%, 33%, 50%, 67%, 85% by weight of the distributed phase may be fibers. The distributed phase may have less than about 5%, 3%, or even 1% by weight of a form other than a fiber.

The fibrous material, which may be formed as a distributed phase, may include an organic material, an inorganic material or a combination of each. The material may be a naturally occurring material (e.g., a rubber, a cellulose, sisal, jute, hemp, or some other naturally occurring material). It may be a synthetic material (e.g., a polymer (which may be a homopolymer, a copolymer, a terpolymer, a blend, or any combination thereof)). It may be a carbon derived material (e.g., carbon fiber, graphite, graphene, or otherwise). The distributed phase may thus include fibers selected from (organic or inorganic) mineral fibers (e.g., glass fibers, such as E-glass fibers, S-glass, B-glass or otherwise), polymeric fibers (e.g., an aramid fiber, a cellulose fiber, or otherwise), carbon fibers, metal fibers, natural fibers (e.g., derived from an agricultural source), or any combination thereof. The plurality of elongated fibers may be oriented generally parallel to each other. They may be braided. They may be twisted. Collections of fibers may be woven and/or nonwoven.

The fibrous material may include a plurality of fibers having a length of at least about 1 cm, 3 cm or even 5 cm or longer. Fibers may have an average diameter of about 1 to about 50 microns (e.g., about 5 to about 25 microns). The fibers may have a suitable sizing coating thereon. The fibers may be present in each layer, or in the fibrous insert generally, in an amount of at least about 20%, 30%, 40% or even 50% by weight. The fibers may be present in each layer, or in the fibrous insert generally, in an amount below about 90%, 80%, or even about 70%, by weight. By way of example, the fibers may be present in each layer, or in the fibrous insert, in an amount of about 50% to about 70% by weight. Fiber contents by weight may be determined in accordance with ASTM D2584-11. The fibers may comprise the reformable thermoplastic polymeric material as described herein.

Tapes and/or sheets (e.g., films) for use in one or more of the portions of a fibrous composite material herein may be made by extrusion, pultrusion or otherwise. Examples of such processes can be found in U.S. Provisional Application Nos. 62/130,908, filed Mar. 10, 2015; U.S. Provisional Application No. 62/200,380, filed Aug. 3, 2015; and U.S. Provisional Application No. 62/296,378, Filed Feb. 17, 2016, all incorporated by reference herein for all purposes. In this manner, it may be possible to achieve ordering of the fibers in the tapes and/or sheets. The tape and/or sheet may be formed from the thermoplastic polymer material. The tape and/or sheet may include a fibrous phase or may alternatively be substantially free of any fibrous phase. The thermoplastic polymeric material may be formed into fibers which may then form the tape and/or sheet. A method herein may include a step of impregnating a fibrous mass with the material of the polymeric matrix and passing the resulting impregnated material through a die (e.g., a heated die) or other structure having an opening so that the fibrous mass is coated with a generally continuous mass of the material of the polymeric matrix. In this manner, it is also possible to achieve desired ordering of fibers relative to each other. The composite materials may be formed by keyed extrusion, whereby a heat staking process is used to attach a mechanical fastener, which may located into a channel formed during the extrusion process. Alternatively, the fastener may be attached at a location with no channel formation.

The fibrous composite materials of the present teachings may include one or more layers (e.g., they may have 2, 3, 4, 6, or 15 or more layers). The layers may be consolidated in the sense that they include a plurality of individual fibers or other segmented forms of a distributed phase, which may be distributed in a cohesive mass of the polymeric matrix material (e.g., a matrix that includes a hydroxy-phenoxyether polymer, such as a polyetheramine thermoplastic material as described herein). For example, the polymer may be a product (e.g., a thermoplastic condensation reaction product) of a reaction of a mono-functional or di-functional species (i.e., respectively, a species having one or two reactive groups, such as an amide containing species), with an epoxide-containing moiety, such as a diepoxide (i.e., a compound having two epoxide functionalities), reacted under conditions for causing the hydroxyl moieties to react with the epoxy moieties to form a generally linear backbone polymer chain with ether linkages. Multiple layers may be consolidated together so that a cohesive mass, including the multiple layers, is formed. The multiple layers may be consolidated so as to form a predetermined shape in the form of a three-dimensional shaped insert. For instance, the fibrous insert may employ a plurality of layers that include a plurality of elongated fibers (e.g., having a length of at least 1 cm, 3 cm or even 5 cm or longer) that are oriented generally parallel or generally unidirectionally to each other and are distributed in a generally continuous polymeric matrix (e.g., in a continuous matrix of the second polymeric material). A shaping operation (e.g., thermoforming, molding, passing through a die, rolling, or otherwise) may be performed.

The fibers may be present in an amount, a distribution, or both for reinforcing the composite article by the realization of an increase of one or more mechanical properties selected from ultimate tensile strength, elongation, flexural modulus, compression modulus, or otherwise, as compared with the corresponding property of the polymer matrix material alone.

The fibrous composite materials of the present teachings may be such so that the distributed phase is distributed in the polymeric matrix material in an ordered arrangement, in a substantially homogenous arrangement or both. It is possible that the distributed phase is distributed in the polymeric matrix material in a random arrangement. The individual fibers may be distributed in a predetermined ordered arrangement within the matrix of polymeric material so that at least a portion of the fibers are ordered in their arrangement (e.g., in a generally ordered relationship relative to each other, such as generally parallel or unidirectional or otherwise generally axially aligned), and thus are not randomly distributed in the polymeric matrix material.

Turning in further detail to the materials that may be employed in the present teachings, a variety of materials having thermoplastic thermal characteristics may be suitable. In general, the teachings herein extend also to certain thermoplastic polymers (e.g., polyamides, such as Nylon 6, or Ultratape from BASF). The materials may be employed alone, as a matrix material of a multi-phasic material (e.g., along with a reinforcement phase, such as carbon fibers, glass fibers, polymeric fibers, natural fibers, or some other segmented form, as described elsewhere herein). It may be employed as a layer of a laminate, as core or a sheath of a core/sheath elongated material, as a core or a shell of a core/shell material, or otherwise.

The materials may be thermoplastic in nature so that it is capable of flowing when subjected to a temperature above its glass transition temperature ($T_g$), and/or a temperature at which it melts. One particular preferred material for use herein is a reformable resin material, and particularly a material that broadly contemplates particular ingredients, reactions and reaction products associated with polymers having an epoxide functionality for imparting at least one mechanical characteristic consistent with epoxy thermoset materials, and at least one processing (e.g., elevated temperature processing) characteristic typically associated with thermoplastic materials (e.g., a glass transition temperature); and still more particularly, the present teachings relate to additive manufacturing with a thermoplastic polyether material, such as a thermoplastic epoxy polymer material.

The materials useful in the present teachings (e.g., as a reformable resin material) may have a relatively low glass transition temperature ($T_g$). It may be possible to have a $T_g$ below about 100° C., below about 90° C., below about 80° C., below about 70° C., below about 65° C., as measured by differential scanning calorimetry according to ASTM E1356-08(2014). The material of the present teachings may have a glass transition temperature as measured by differential scanning calorimetry according to ASTM E1356-08 (2014) of at least about 45° C., at least about 55° C., or at least about 60° C. The use of such materials has the ability to enhance productivity substantially. Energy consumption can be reduced. Build times can be shortened. Still, the resulting materials could result in materials having very attractive mechanical and/or self-adhering characteristics that make it attractive for additive manufacturing builds.

As the following also illustrates, the reformable resin material may have a relatively high $T_g$. It may be possible to have a in excess of about 115° C., or in excess of about 125° C., or in excess of about 135° C. as measured by differential scanning calorimetry according to ASTM E1356-08(2014). The polymer and/or reaction product of the present teachings may have a glass transition temperature as measured by differential scanning calorimetry according to ASTM E1356-08(2014) of below about 200° C., below about 185° C., or below about 170° C. By way of illustration, the polymer and/or reaction product of the present teachings may have a glass transition temperature as measured by differential scanning calorimetry according to ASTM E1356-08(2014) of at least about 120° C., and below about 170° C.

The polymeric material may exhibit one or any combination of the following characteristics: a tensile strength at yield (according to ASTM D638-14) of at least about 15 MPa (e.g., at least about 30 MPa or even at least about 45 MPa), a tensile elongation strength at break (according to ASTM D638-14) of at least about 40 MPa (e.g., at least about 45 MPa or even at least about 55 MPa); an elongation at break (according to ASTM D638-14) of at least about 15% (e.g., at least about 20%, 25% or 30%); and/or a tensile modulus of elasticity (according to ASTM 0638-14) of at least about 0.5 GPa, (e.g., at least about 1 GPa, at least about 1.8 GPa, or even at least about 2.7 GPa).

By way of illustration of various illustrative materials, the following identifies various possible reactions that may be employed for making a reformable resin material.

In general, at present, any reaction suitable for achieving the desired resulting characteristics in a reformable resin material may be employed. At least two reaction approaches are contemplated as within the scope of the present teachings. Either or both in combination may be employed. In a first approach, a reaction is employed to result in a poly (hydroxyaminoether), (PHAE). In a second approach, a reaction is employed to result in a thermoplastic epoxy polymer that is essentially devoid of nitrogen and/or an amine moiety along its backbone.

Exemplary materials may be made with a difunctional epoxy resin and a primary amine or a secondary diamine, e.g., a reaction between diglycidyl ether of bisphenol A and monoethanolamine. For some applications that may require a higher glass transition temperature (Tg), it is contemplated that some or all of the diglycidyl ether of bisphenol A may be replaced by an epoxy monomer with less mobility. Such epoxy monomers may include diglycidylether of fluorene diphenol or 1,6 napthalene diepoxy. Also, it is contemplated that where fire resistance is desired, some or all of the diglycidyl ether of bisphenol A may be replaced by a brominated bisphenol A epoxy resin. In accordance with this approach materials be prepared by reacting a diglycidyl ether of dihydric aromatic compounds such as the diglycidyl other of bisphenol A, or a diepoxy-functionalized oly(alkylene oxide) or mixture thereof with a primary amine or a secondary diamine or a monoamine functionalized poly (alkylene oxide) or mixture thereof.

Such materials generally have a relatively high flexural strength and modulus, often much higher than typical polyolefins (i.e., polyethylene and polypropylene). Such materials may be melt processable at temperatures such as a temperature above about 70° C. about 85° C. or about 90° C., and/or below about 300° C., about 250° C., about 230° C., or about 210° C. In addition, use of the reformable resin materials described herein for carrier structures provide for improved rigidity and/or improved adhesion when bonded adhesively to another article, e.g., as compared with another traditional polymeric material such as a polyolefin, a polyamide, a polyester, a polyurethane, a polysulfone, or the like.

As the teachings herein illustrate, other epoxide-containing moieties may be employed. Epoxide-containing moieties may include at least one mono-functional epoxide and/or a di-functional epoxide ("diepoxide"). Among the various diepoxides that can be employed in the teachings, there may be a diglycidyl ether of a dihydric phenol (e.g., resorcinol, biphenol or bisphenol A). Any epoxide-containing moiety herein may be an aliphatic and/or an aromatic epoxide.

An illustration of one possible example of such a material may be a reaction product of a diglycidyl ether of a dihydroxy organic compound and an amino, namely one having two amino hydrogens per molecule (e.g., a reaction product of a diglycidyl ether of bisphenol A and a monoethanolamine), as described for example at col. 1, line 4 through col. 2, line 52 in U.S. Pat. No. 3,317,471 (incorporated by reference).

Additional details of suitable reactants and conditions for this first approach can be found in Published United States Application No. 2007/0270515 (see, e.g., paragraphs [0014]-[0025]), U.S. Pat. No. 5,164,472 (see, e.g., cols. 2-4); and U.S. Pat. No. 3,317,471 (see, e.g., col. 1, line 4 through col. 2, line 52), all incorporated by reference.

Referring in more detail to the second approach, without limitation, this approach may be employed in instances when it is desired to employ a material having a relatively high glass transition temperature. One approach envisions a reaction that may include a step of reacting a dihydric phenol or combination of different dihydric phenols with a diepoxide or combination of different diepoxides. The reaction may occur in the presence of a catalyst, (e.g., a catalyst selected from the group consisting of bis(trihydrocarbylphosphoranylidene)ammonium salt, bis[tris(dihydrocarbylamino)phosphoranylidene]ammonium salt, and tetrakis[tris(dihydrocarbylamino)phosphoranylideneamino]phosphonium salt). The reaction between the dihydric phenol and the diepoxide may be conducted in an ether or hydroxy ether solvent at a temperature sufficiently high to produce a poly(hydroxy ether). A particular illustration of such possible approach to forming a reformable resin malarial having a relatively high glass transition temperature may be gleaned from U.S. Pat. No. 5,401,814; incorporated by reference. One approach envisions a reaction that may include a step of reading a dihydro phenol or combination of different dihydric phenols with a diepoxide or combination of different diepoxides. The reaction may occur in the presence of a catalyst, (e.g., a catalyst selected from the group consisting of bis(trihydrocarbylphosphoranylidene)ammonium salt, bis[tris(dihydrocarbylamino)phosphoranylidene]ammonium salt, and tetrakis[tris(dihydrocarbylamino)phosphoranylideneamino]phosphonium salt). The reaction between the dihydric phenol and the diepoxide may be conducted in an ether or hydroxy ether solvent at a temperature sufficiently high to produce a poly(hydroxy ether). A particular illustration of such possible approach to forming a reformable resin material having a relatively high glass transition temperature may be gleaned from U.S. Pat. No. 5,401,814; incorporated by reference.

Approaches other than the above to reactions tor making materials useful for the present teachings (e.g., a thermoplastic polyether) may include one or more reactions selected from the above first and second approaches, or (a) a reaction product of diglycidyl ether of a biphenol with a dihydroxybiphenyl, in which the repeating unit of the polyhydroxyether contains a hydrocarbon connecting group and a hydrocarbon or halogen substituted phenylene radical, as described in U.S. Pat. No. 4,547,648 (incorporated by reference); (b) a reaction product of a diglydicyl ether of certain amido-dihydric phenols and N-substituted dihydric phenols, as described in U.S. Pat. No. 5,115,075 (incorporated by reference); (c) a reaction product of a dihydric phenol (e.g., a diglycidyl ether of one or more of bisphenol ketone, bisphenol sulfone, resorcinol, or hydroquinone) and at least one ether dihydric phenol such as 4,4'-ispropylidene bisphen (bisphenol A), 4,4'-dihydroxydiphenylethylmethane, 3,3'-dihydroxydiphenyldiethylmethane, 3,4'-dihydroxydiphenyl-methylpropylmethane, bisphenol, 4,4'-dihydroxydiphenyloxide, 4,4'-dihydroxydiphenylcyanomethane, 4,4'-dihydroxybiphenyl, 4,4'-dihydroxybenzophenone, 4,4'-dihydroxydiphenyl sulfide, 4,4'-dihydroxydiphenyl sulfone, 2,6-dihydroxynaphthalene, 1,4'-dihydroxynaphthalene, catechol, or the like, as described in U.S. Pat. No. 5,164,472 (incorporated by reference); (d) a reaction product (e.g., a reactive extrusion product) of a diglycidyl ether of a dihydric phenol with an amine having only two hydrogens under conditions sufficient to form the polyetheramine, as described in U.S. Pat. No. 5,275,053 (incorporated by reference); (e) a reaction product of dihydric phenol and a diepoxide in the presence of a catalyst selected from bis(trihydrocarbylphosphoranylidene)ammonium salt, bis[tris(dihydrocarbylamino)phosphoranylidene]ammonium salt, or tetrakis[tris(dihydrocarbylamino)phosphoranylideneamino]phosphonium salt, as described in U.S. Pat. No. 5,401,814 (incorporated by reference); (f) a reaction product prepared by reacting (1) a primary amine or bis(secondary) diamine with (2) a diglycidyl ether and (3) an amine- or epoxy-functionalized poly(alkylene oxide), as described in U.S. Pat. No. 5,464,324 (incorporated by reference); (g) a reaction product of a compound having an average of more then one vicinal epoxide group per molecule and a polyhydric phenol or thiophenol, in the presence of a catalytic amount of a tetrahydrocarbyl phosphonium salt in an essentially anhydrous medium, as described in U.S. Pat. No. 4,438,254 (incorporated by reference); (h) a reaction product of a diepoxide (e.g., diglycidyl ethers of dihydric phenols) and a difunctional species selected from dihydric phenols, dicarboxylic acids, bis-secondary amines, primary amines, dithiols, disulfonamides, and compounds that contain two different functionaries capable of reacting with epoxide groups, as described in U.S. Pat. No. 6,011,111 (incorporated by reference); or (i) a hydroxy-phenoxyether reaction product polymer prepared by reacting a difunctional species (that is, a species having two reactive groups), such as a dihydric phenol, with a diepoxide (that is, a compound having two epoxide functionalities) under conditions sufficient to cause the hydroxyl moieties to react with the epoxy moieties to form ether linkages, as described in WO98/14488 (incorporated by reference).

It is possible that two or more of the reformable resin compositions described above may be utilized together. For example, two or more reformable resins, each with different glass transition temperatures may be used together for selectively varying properties. This can be achieved by blending the two, or by intermingling preforms of each (e.g., a yarn or weave that has fibers of both higher and lower glass transition).

Reformable resin materials according to the present teachings may have a generally linear backbone and may also have at least one ether linkage in repeating units of the generally linear backbone. Materials according to the present teachings may be free of crosslinking, or of any thermoset portion chemically bonded to a generally linear backbone.

In general, it may also be possible to employ one or more reactants that permit an optional delayed cross-linking reaction to occur. For example, one or more of the reactants may include one or more moieties that are capable of reacting (e.g., in the presence of a certain stimulus, such as further heating and/or some other form of a predetermined electromagnetic radiation (e.g., infrared, ultraviolet, microwave or otherwise) for achieving cross-linking of a molecule will) in itself and/or with an adjoining molecule. Desirably such radiation affords cross-linking while maintaining a resulting article made by additive manufacturing to remain below its $T_g$. Thus, it may be possible that crosslinking may be realized within and/or between adjoining layers. Thus, the teachings contemplate an optional step of causing at least a portion of an article made with the teachings to include cross-linking, such as by causing a cross-linking reaction to occur (e.g., by subjecting feed material and/or the resulting article to electromagnetic radiation as described).

The teachings herein make advantageous use of reformable resin materials for use in various applications, such as in the construction, appliance, defense, sporting goods, and/or transportation industries. By way of example, reformable resin materials of the teachings find application in transportation vehicle components, such as structural reinforcements, baffle devices, sealing devices, panels (e.g., wall panels, automotive body panels, roof panels, etc.), brackets, beams (e.g., cross-vehicle beams, such as beams useful for supporting instruments of an instrument panel), module frames (e.g., a frame upon which a plurality of components can be mounted, either before, during and/or after assembly of the frame info a vehicle structure).

The resulting articles not only can be made by taking advantage of the beneficial processing characteristics consistent with thermoplastics of the reformable resin materials. But, upon fabrication of the articles, the articles may be further modifiable by forming or otherwise shaping, by heating the article to a temperature above which at least a portion of the reformable resin material that is incorporated into the article is elevated above its $T_g$. Thereafter, the article can be cooled so the material is below the $T_g$, thereby causing the material to retain its desired shape. At one or more times when the reformable resin material is above its $T_g$ the reformable resin material is such that it becomes tacky and can form an adhesive bond with an item placed on it. Thus, teachings herein contemplate heating an article having a wall to which a component is to be attached to an elevated temperature above which at least a portion (e.g., below about 60%, about 50%, about 40% about 30%, about 20% or about 10% of the average wall thickness) of the reformable resin material that is incorporated into the wall of the article is elevated above its $T_g$. At such time when the portion of the reformable resin material is above its $T_g$, a component is placed in contact with it (optionally in the presence of pressure). Thereafter, the article can be cooled so the material is below the $T_g$, thereby causing the material to retain its desired shape and secure the component to it by adhesive bonding. It is possible to make use of the $T_g$ and adhesive characteristics of the reformable resins in order to simplify assembly structures by removing the need for certain attachment hardware. This allows for attaching a component directly to the article adhesively, without mechanical fastener hardware or over molding a structure onto a pultruded beam (the beam may be partially or fully encapsulated by the molded material).

With reference to the material of the polymeric matrix, it may include a thermoplastic polymer (e.g. a reformable resin). The polymer may be a hydroxy-phenoxyether polymer, such as a polyetheramine thermoplastic material. Though other functional species may be employed, as is taught in U.S. Pat. No. 6,011,111 (incorporated by reference; see, e.g., Cols. 6-8) and WO 90/14498 (incorporated by reference; see, e.g., pages 8-11) examples of mono-functional or di-functional species may include a dihydric phenol, a secondary amine (e.g., a bis-secondary amine), a primary amine, or any combination thereof. Any amine of the functional species can be an aromatic amine, an aliphatic amine or a combination thereof. The mono functional or di-functional species may have one or two functionalities capable of reacting with epoxide groups to form a generally non-cross-linked polymer. Some particular examples, without limitation, of functional species for reaction with an epoxy moiety in accordance with the present teachings includes an ethanolamine (e.g., monoethanolamine), piperazine or a combination thereof. Any of the illustrative functional species may be substituted or unsubstituted.

Other examples of illustrative materials, functional species and diepoxides are described in U.S. Pat. Nos. 5,115,075; 4,438,254; 6,011,111; and WO 96/14498 (see e.g., pages 3-8) along with illustrative synthesis conditions, all incorporated by reference herein (see also U.S. Pat. Nos. 3,317,471 and 4,647,648, also incorporated by reference herein). Examples of such materials also can be found, without limitation at paragraphs 15-25 of Published U.S. Patent Application No. 20070270515 (Chmielewski et al), incorporated by reference for all purposes.

The teachings herein also relate to a method for making a composite article. In general, a method in accordance with the present teachings may employ a stop of contacting a plurality of segmented forms provided for defining a distributed phase with a generally thermoplastic epoxy reaction product of reactants (e.g., a mono-functional or di-functional species (i.e., respectively, a species having one or two reactive groups, such as an amide containing species), with an epoxide-containing moiety, such as a diepoxide (i.e., a compound having two epoxide functionalities)), that is in a softened state (e.g., in a liquefied molten state). For instance, a method in accordance with the present teachings may employ forming a composite material by passing a mass of fibers and resin through a die (e.g., by extrusion and/or pultrusion), by molding (e.g., injection melding, compression molding, or otherwise), or a combination of each. One or more other methods may be employed to make articles in accordance with the present teachings. For example, it may be possible to make a product by thermoforming.

Thus, it is envisioned for the teachings herein that mere is method of making the fibrous composite article that includes contacting at least a portion of the intended distributed phase material with a generally thermoplastic epoxy reaction product of reactants (e.g., a mono-functional or di-functional species (i.e., respectively, a species having one or two reactive groups, such as an amide containing species), with an epoxide-containing moiety, such as a diepoxide (i.e., a compound having two epoxide functionalities)). For example, consistent with the teachings herein of the proposed polymeric matrix material, the polymeric matrix material may include as a major component an epoxy/amine reaction product material (e.g., a material that is a reaction product of an epoxy resin (e.g., a liquid di-epoxide resin) and an amine (e.g., a monoethanolamine), such as a reaction product wherein the reactants as described herein may be reacted in a generally equal molar ratio) during a step of extrusion, injection molding, pultrusion or any combination thereof. The contacting may be only after the reaction has completed between the epoxy and the amine (e.g., only after the reaction of epoxy and amine reactants). The fibrous material may be contacted by the thermoplastic polymer material only at a shaping or molding step. Thus it is possible that the method herein will involve no chemical reaction between any reactants (e.g., any epoxy and amine reactants) that occurs within a molding or shaping machine in which the reaction product and the intended distributed phase materials are brought into contact. That is, the method may include advancing a thermoplastic polymer having at least one epoxide functional group reaction product along a rotating feed screw within a barrel of a polymeric material shaping apparatus, and then contacting the thermoplastic polymer with the intended distributed phase material.

It is also possible that a portion of the intended distributed phase material is contacted with reactants prior to any reaction to form the thermoplastic polymer reaction product of the present teachings. For example, it may be possible that the intended distributed phase material is contacted with either or both of an epoxy or amine reactant (e.g., in a liquid state) prior to reaction to form the thermoplastic polymer reaction product. For example, a mass of fibers may be infiltrated with a liquid epoxy reactant, a liquid amine reactant or both. Thereafter, any remaining reactant may be introduced (along with exposure to any necessary heat and/or pressure) for bringing about a reaction to form the thermoplastic polymer reaction product in situ within the mass of fibers. Use of the reformable resins described herein as pultrusion polymers, when in a fluidic state, are able to provide a surprisingly good infiltration of a mass of fibers for providing an cohesive matrix within which the fibers are distributed.

A method for making an article in accordance with the present teachings may be performed in a continuous manner. For example, fibrous material from a continuous supply (e.g., a reel of the desired fibrous material (e.g., in its desired form, such as a strand, a yarn, a weave, nonwoven mat, or otherwise as described herein) for use as the distributed phase) may be fed continuously to and through a die, which may be an extrusion or pultrusion die. The fibrous material may be contacted (e.g., by way of a suitable coating operation, such as roll coating, or otherwise) with the thermoplastic polymer reaction product prior to or at the time when the fibrous material is passed through the die. The fibrous material may be contacted (e.g., by way of a suitable coating operation, such as roll coating, or otherwise) with the reactants for the thermoplastic polymer reaction product prior to or at the time when the fibrous material is passed through the die. Upon exiting the die, a composite mass results. The fibrous material may thus form a distributed phase within the composite mass. The mass may be cut, shaped or otherwise subjected to another (e.g., a secondary) operation to render a composite article suitable for use for an intended application.

It may be possible also that a step of co-extrusion may be employed. The step of co-extrusion may include a step of passing a composite mass, such as described above, through a die, while also feeding a supply of base material through the die. The base material may be a polymeric material, a metal material or otherwise. Conditions may be maintained while the materials are passed through the die so that the composite mass becomes bonded to (e.g., mechanically, adhesively, covalently, or any combination thereof), to the resulting shaped base material. For example, it may be possible that the heat from the base material while it is processed through the die, or essentially immediately thereafter, may be sufficiently hot to cause the thermoplastic polymer reaction product to fuse with or otherwise bond to the base material. A shaping step may be included which may allow for a plurality of layers to be assembled in a press which may or may not be a heated press.

As can be appreciated, a variety of suitable composite profiles are possible as a result of the teachings. The profiles may include a longitudinal axis. The composite profiles may be symmetric or asymmetric relative to the longitudinal axis. The composite profiles may include one or more longitudinally oriented ribs. The composite profiles may include one or more transversely extending flanges. The composite profiles may include both flat portions and curved portions. The composite profiles may have one or more outer surfaces. The composite profile may have one or more inner surfaces. The composite profiles may include a composite overlay that includes or consists of a composite mass of the present teachings. The composite profiles of the teachings may include a composite overlay that includes or consists of a composite mass of the present teachings. The composite overlay may cover all or part of an outer or inner surface. The composite overlay may include or consist of a composite mass of the present teachings may define all or part of a rib, a flange (e.g., a transversely oriented flange) or both. The composite profiles may include a composite mass that is at least partially or even completely embedded within the base material over some or all of the length of the composite profits. The composite profile may include an extruded profile structure defining a mechanical attachment for securing the profile to another structure (e.g., such as is disclosed in U.S. Pat. No. 7,784,186 (incorporated by reference; see. e.g., FIGS. 4-8 and associated written description). The composite profile may also have one or more push pin type fasteners such as disclosed in U.S. Pat. No. 7,784,186 (incorporated by reference; see, e.g., FIGS. 1-3 and associated written description). Any of the above can be employed for use as an extruded carrier for a structural reinforcement and/or baffle (e.g., for a transportation vehicle).

For use as an extruded earner for a structural reinforcement and/or baffle (e.g., for a transportation vehicle), there may also be employed an activatable material or at least a portion of an outer surface of the carrier.

The teachings also envision a possible manufacturing system that may be employed for an extrusion operation in accordance with the present teachings. Raw material for forming a base polymeric material body are fed into a hopper associated with an extruder. The extruder may have a die through which the raw material is passed to form a shaped body profile (e.g., an extruded profile). The shaped body profile may be cooled (e.g., by a vacuum cooler) to a desired temperature (e.g., below the softening point of the material, so that it retains its shaped state). A feed system may feed a fibrous material (e.g., by way of rollers) to a suitable device for applying a matrix material for defining a composite fibrous material (e.g., a roll coater). At such device, the material for forming a polymeric matrix is contacted with the fibrous material. A suitable device for defining a shape of the fibrous composite material may be employed, such as a forming roller, a heated press, or another suitable extrusion and/or pultrusion type shaping devices). The forming roller or other suitable device may also serve to help join the fibrous composite material with the shaped base body profile.

Upon joinder the resulting overall composite may be cooled (e.g., by a cooling tank). Optionally, if to be employed for use as a carrier for a baffling and/or structural reinforcement application, the resulting overall composite may be advanced by a conveyor device (e.g., a pulling or pushing device). An activatable material (e.g., a polymeric heat activatable sealant, acoustic foamable material, and/or structural reinforcement material) may be applied to the composite by an extruder (e.g., a cross head extruder). Thereafter, the resulting composite (with or without the activatable material on it) may be cut by a suitable cutting device (e.g., a traveling cut-off saw). By way of illustration, without limitation, the raw material may be a glass filled Nylon® heated to about 260° C. Upon exiting the cooler, the temperature may be about 150 to about 175° C. The fibers may be class fibers that are roll coated with a reaction product of a monoethanolamine and diglycidyl ether of bisphenol A, while the reaction product in a softened state. Upon exiting the cooling tank the composite may be at a temperature of about 120° C. At the time of passing the extruder, the temperature may be about 90-95° C. The cross-head extruder may extrude one of more masses of a heat activatable epoxy-based structural foam, such as the L-55xx series of materials, available from L&L Products, Inc. See, e.g., U.S. Pat. No. 7,802,396, incorporated by reference for all purposes (an illustrative composition is shown therein at Table I). The heat activatable material may be activatable to expand by learning, and adhere to an adjoining surface (e.g., a wall defining a part of a vehicle, such as a wall defining a vehicle cavity). The activation may occur upon exposure to the heat of a paint bake oven or induction heating device, following an electrocoating deposition step. The resulting activated material may be expanded to at least about 50%, 100%, 200%, 400%, 600%, or even 1000% of its original volume. The resulting activated material may be expanded from its original volume, but in an amount that is below about 2500%, 2000% or even below about 1500% of its original volume.

The composite material of the present teachings offers the benefit of mechanical properties typically achieved through the use of thermostat polymeric materials (e.g., a thermoset epoxy material) as some or all of a matrix phase of a composite. However, the material has a number of physical attributes that make it suitable for handling and processing, as can be appreciated form the above discussion of processing. The material of the present teachings can also provide post-useful life reclamation, recycling, and/or re-use benefits. The present teachings thus also contemplate methods that include one or more steps of post-useful life reclaiming, recycling, and/or re-using the materials of live present teachings. For example, a step may be employed of separating the polymeric phase (e.g., the polymeric matrix phase) from the distributed phase. A step may be employed of refusing one or more phases of the composite of the present teachings. A stop may be employed of recycling one or more phases of the present teachings (e.g., processing at least one of the phases to a different form, size and or shape, from its original form, size and/or shape in the composite material of the present teachings. The material of the present teachings may exhibit a high elongation factor so that it is not brittle yet still very strong. The material may be able to bond to a desired part, substrate, or location. This provides a benefit that assembly operations may be free of welding. The assembly operation may be free of an assembly tolerance stackup. As components may be bonded together (e.g., without mechanical fasteners), the parts may be free of holes, thereby improving precision and eliminating inconsistent punching operations (e.g., with sheet metal). The material may case geometric dimensioning and tolerances.

The fibrous composite material of the present teachings may be employed in any of a variety of possible forms, it may be employed as an overlay on fop of a body (e.g., a shaped polymeric body). It may be employed as an insert (e.g., for forming a continuous adjoining surface with a shaped polymeric body). It may be an encapsulated insert within a shaped polymeric body. It may be employed as a substitute for sheet metal. It may be employed as a substitute for a tube or other generally cylindrical element (e.g., a roll tube or a hydroformed tube). The fibrous composite material may be a patch, a strip, a wrap, or the like that may be used to provide localized reinforcement to another component of an assembly (e.g., a beam that receives some load). The fibrous composite material may be rolled into a tubular shape (e.g., for use as or with cross-car beams, side intrusion or impact beams, or other automotive parts). The fibrous composite material may be thermoformed into a desired shape (e.g., for a roof bow, bumper, or other automotive part). The fibrous composite material may be shaped to provide a structure and support for subcomponents of an assembly. For example, the fibrous composite material may be shaped to form a boor inner module, which may provide an internal structure within a vehicle door, which may also provide an area for mounting and/or supporting subcomponents within the door (e.g., a motor for actuating movement of the windows, the locking mechanism, a wire harness, speaker system, ventilation components, mirror controls, demister, and the like).

In one aspect of the present teachings there is contemplated a baffle and/or a structural reinforcement for an article. The baffle and/or structural reinforcement includes a carrier that includes a mass of polymeric material having an outer surface and including a first polymeric material (e.g., a first thermoplastic material). The carrier may be made of a single polymeric material, or a plurality of polymeric materials. The carrier may include a fibrous composite material of the present teachings. That is, the carrier may include a distributed segmented form phase and a polymeric matrix phase.

The polymeric material (e.g., the thermoplastic polymer material) of the fibrous composite material of the teachings may be the same as or different from a polymeric body of the carrier. The fibrous composite material of the teachings may be employed on or within a polymeric body of the carrier.

By way of illustration, the carrier may employ at least one consolidated fibrous insert (which may have a predetermined ordering of fibers within the insert and/or may have a three dimensional shaped configuration) having an outer surface. The carrier may be a polymeric material layer located adjacent one or more additional layers including a fibrous layer and a thermoplastic polymer layer. The fibrous material may include at least one consolidated fibrous insert including at least one elongated liber arrangement (e.g., having a mass of continuous fibers, which may be in an ordered arrangement, such as by being generally axially aligned relative to each other) distributed in a cohesive mass of a second polymeric material (e.g., a second thermoplastic material). The fibrous insert and associated second polymeric material may adjoin the mass of the first polymeric material in a predetermined location for carrying a predetermined load that is subjected upon the predetermined location. The fibrous insert, the second polymeric material and the mass of first polymeric material include compatible materials, structures or both, for allowing the fibrous insert to be at least partially joined to (e.g., form a single please with or be miscible in) the mass of the first polymeric material. The structural reinforcement may also include a mass of activatable material selectively applied over at least a portion of one or both of the outer surface of the mass of the polymeric material or the fibrous insert (e.g., on exterior peripheral surface of the earner, within a cavity of the carrier, or both). The mass of activatable material is capable of activation for expansion by an external stimulus (e.g., heat, moisture, radiation or otherwise) and is capable of curing to form an adhesive bond to at least one surface of the article. Desirably the outer surface of the fibrous insert may be at least partially coextensive and continuous with the outer surface of the mass of polymeric material.

Materials for a carrier body herein may be a polyamide, a polyolefin (e.g., polyethylene, polypropylene, or otherwise), a polycarbonate, a polyester (e.g., polyethylene terephthalate), an epoxy based material, a thermoplastic polyurethane, or any combination thereof. It may be preferred to employ a polyamide (e.g., polyamide 6, polyamide 6,6, polyamide 9, polyamide 10, polyamide 12 or the like). The materials of a carrier body and any overlay and/or insert may be generally compatible with each other in that they are capable of forming a mechanical or other physical interconnection (e.g., a microscopic interconnection) between them, they are capable of forming a chemical bond between them, or both. For example, the first and second materials may be such that they fuse together (e.g., in the absence of any adhesive) when heated above their melting point and/or their softening point. The carriers may also be overmolded with a secondary material, such secondary material may be a polymeric material such as a polyolefin, a polyamide, a polyester, a polyurethane, a polysulfone, or the like, or an expandable polymer (e.g., a structural foam or an acoustic foam).

The polymeric body of any carrier may include a polymeric material that may be filled with chopped fibers (e.g., chopped glass fibers), which may be present in amount of about 25 to about 40 (e.g., about 30 to about 35) weight percent chopped fibers. The average length of such fibers may be below about 20 mm, below about 10 mm or even below about 5 mm. They may be randomly oriented. The first and second materials may be free of any metallic materials.

A fibrous insert and/or layer may include one or more layers (e.g., they may have 2, 3, 4, 6, or 15 or more layers) that are consolidated in the sense that they include a plurality of individual fibers that are distributed in a cohesive mass of the second polymeric material. The individual fibers may be distributed in a predetermined ordered arrangement within a matrix of the second polymeric material. Preferably at least a portion of the fibers are ordered in their arrangement (e.g., in a generally ordered relationship relative to each other, such as generally parallel or unidirectional or otherwise generally axially aligned), and thus are not randomly distributed in the second polymeric material. Multiple layers may be consolidated together so that a cohesive mass, including the multiple layers, is formed. The multiple layers may be consolidated so as to form a predetermined shape in the form of a three-dimensional shaped insert. It is also possible that a film or intermediate layer may be located in between one or more of the multiple layers. For instance, the fibrous insert may employ a plurality of layers that include a plurality of elongated fibers (e.g., having a length of at least 1 cm, 3 cm or even 5 cm or longer) that are oriented generally parallel or generally unidirectionally to each other and are distributed in a generally continuous polymeric matrix (e.g., in a continuous matrix of the second polymeric material). The fibers may be mineral fibers (e.g., glass fibers, such as E-glass fibers, S-glass, B-glass or otherwise), polymeric fibers (e.g., an aramid fiber, a cellulose fiber, or otherwise), carbon fibers, metal fibers, natural fibers (e.g., derived from an agricultural source), or otherwise. Desirably the fibers are glass fibers. The plurality of elongated fibers may be oriented generally parallel to each other. They may be braided. They may be twisted. Collections of fibers may be woven and/or nonwoven. The fibers may have an average diameter of about 1 to about 50 microns (e.g., about 5 to about 25 microns). The fibers may have a suitable sizing coating thereon. The fibers may be present in each layer, or in the fibrous insert generally, in an amount of at least about 20%, 30%, 40% or even 50% by weight. The fibers may be present in each layer, or in the fibrous insert generally, in an amount below about 90%, 60%, or even about 70%, by weight. By way of example, the fibers may be present in each layer, or in the fibrous insert, in an amount of about 50% to about 70% by weight. Fiber contents by weight may be determined in accordance with ASTM D2584-11. Tapes and/or sheets for the layers of the fibrous insert may be made by extrusion, pultrusion or otherwise. In this manner, it may be possible to achieve ordering of the fibers in the tapes and/or sheets. The method herein may include a step of impregnating a fibrous mass with the material of the polymeric matrix and passing the resuming impregnated material through a die (e.g., a heated die) so that the fibrous mass is coated with a generally continuous mass of the material of the polymeric matrix. In this manner, it is also possible to achieve desired ordering of fibers relative to each other.

Each layer of the fibrous insert may be in me form of a sheet, a tape or otherwise. Fibers in the sheet and/or tape preferably may have an ordered relationship relative to each other. For example, the fibers may be generally parallel with each other and/or oriented unidirectionally. When consolidating multiple layers of sheet, tape or other form of layer to form a multiply fibrous insert, it is preferred that at least one layer of the fibrous insert exhibits an ordered relationship, as opposed to a random relationship, such as is found in fiber mats, which typically employ chopped fibers that are randomly laid across each other.

It is possible that the layers of the fibrous insert are provided as being wound on a reel. Each layer may have a thickness of at least about 0.1 mm or at least about 0.2 mm. Each layer may have a thickness below about 0.5 mm or below about 0.4 mm. For instance, each layer may be about 0.2 to about 0.3 mm in thickness. Some or all of the individual layers may be anisotropic in its mechanical properties. For example, it may exhibit a relatively high flexural modulus and/or strength in a longitudinal direction, but a lower flexural modulus and/or strength in a transverse direction, or vice versa.

The fibrous material may include a plurality of woven strips. For example, it may include a plurality of strips that are cross woven, each strip having a width of at least about 1 mm, at least about 2 mm, or even at least about 3 mm. It may include a plurality of strips that are cross woven, each having a width below about 10 mm, below about 8 mm, or even below about 6 mm. The woven strips may be held together by a polymeric matrix material, e.g., a continuous matrix of the polymeric material of the insert. Thus, the strips are fixed in a predetermined position relative to each other by virtue of the polymeric material. It is preferred that at least some of the strips may each include a plurality of elongated fibers arranged in an ordered relationship relative to each other, desirably within a continuous matrix of polymeric material. However, it is possible that one or more strips may include fibers having a random orientation relationship relative to each other, such as is derived from typical fiber mats. Strips for forming weaves may be made by slitting a tape, sheet or other form to an appropriate width to form strips. Alternatively, it may be possible that the strips are pultruded, extruded or otherwise formed (as described herein) in the desired width.

The material defining the fibrous insert may exhibit a flexural strength per ASTM D790-10 of at least about 450 MPa (e.g., it may range from about 500 to about 1100 MPa). The material of the fibrous insert may exhibit a flexural modulus per ASTM D790-10 of at least about 5 GPa, 10 GPa, 20 GPa, or even at least about 25 GPa (e.g., it may range from about 30 to about 35 GPa).

The fibrous insert may employ a fully densified polymer for the polymeric matrix. The fibrous insert may have a void content that is below about 10% by volume of the insert, and more preferably below about 5% or even below about 2% or 1% as measured by ASTM D2734-09. The fibrous insert may have a density that is below about 40% the density of steel, below about 33% the density of steel, or even below about 25% the density of plain carbon steel.

The fibrous insert may be mads to include a plurality of adjoining layers. The adjoining layers may have fiber orientations that are the same or different relative to each other. The fibrous insert may include a woven layer adjoining a non-woven layer. The fibrous insert may include a woven layer adjoining another woven layer. The weave pattern of woven layers within the fibrous insert may be the same or may vary between such woven layers. The width of strips may vary between adjoining layers. The thickness of adjoining layers may be the same or different.

Examples of weave patterns include plain weaves, twill weaves, or otherwise. Overlapping strips may be woven generally orthogonal to one another or at some other angle. The weave may include a plurality of warp and watt scrips. The ratio of warp to weft strips may range from about 30:70 to about 70:30. For example it may be about 50:50. It is possible that strips of the warp and weft members may have generally the same width. The warp strip and weft strip widths may vary relative to each other by 10%, 20%, 30% or more. The warp strip and weft strip widths may vary relative to each other by less than about 70%, 60%, 50% or less.

Each adjoining layer of tape and/or sheet in the fibrous inserts herein may be oriented so that it has fibers (i.e., the fibers that are embedded in the polymeric matrix of the tape and/or sheet) aligned in a different predetermined direction relative to fibers of an adjoining layer. Fibers in one layer may be generally at an angle relative to fibers in an adjoining layer (e.g., the axis of fiber orientation as between layers may differ from about 10 to about 90°, such as in the form of an X-ply). For example, one multiple layer structure may include one layer that may have fibers oriented in a first direction of a first plane, and an adjoining layer oriented with its fibers generally in a second plane parallel to the first plane, but at an approximately 90 degree angle.

Desirably each of the adjoining layers are joined together as a cohesive mass. For instance, each of the layers may be bended together by the polymeric material of the respective layers to form a series of continuous layers. The layers may be bonded together in the absence of any adhesive.

The fibrous composite material, such as in the form of a sheet or a tape (which may serve as a patch or a wrap), may be applied to control failure modes of certain components of an assembly which may be subject to a load, to provide localized reinforcement, or both. For example, a hollow beam (e.g., having a rectangular cross section) receiving a load from the top may have a tendency to shear. Strength may be improved and/or the failure mode may be altered by adding a fibrous composite material as disclosed herein. The fibrous composite material may be attached to the hollow beam to alter its deformation characteristics (e.g., with the composite material being generally planar (or in planar contact with a portion of the beam), acting as a shell around the beam, surrounding the beam as a wrap in a generally helical direction, as a generally cylindrical or tubular structure outside or inside of the hollow beam, or another configuration). For example, a woven tape may be applied along the side walls of the beam to help resist having a shear plane that arises substantially along the longitudinal axis of the beam (traveling through the middle of the part). The tape (or other form fibrous composite material) may be single ply or multi-ply, with a combination of fiber orientations (e.g., one layer having fibers generally oriented in the longitudinal direction, another layer having fibers in an orientation that is at an angle relative to the longitudinal direction (e.g., at 90 degrees, 45 degrees or otherwise)). The fiber directions may assist in resisting shear or may provide control and/or predictability in failure of the component (e.g., a beam) upon being subjected to a particular load. A secondary component may be applied to further increase strength or alter the failure mode, such as another fibrous layer having a different orientation, or may be a metal, a foam component (inside or outside of the hollow beam, for example), a fibrous mat, or a ductile material (e.g., a rubber-like material).

The fibrous insert may have one or more structural features incorporated therein or attached thereto. For example, one or more fasteners may be employed (e.g., one or more threaded fasteners). One or more lugs may be formed or integrated into the fibrous insert (e.g., for providing a gap for the passage of a coating fluid). One or more rivets (e.g., a self-piercing rivet, a blind rival or both) may be integrated into the insert. One or more metal blanks may be integrated into the insert, which may be adapted to provide a location on a resulting part for spot welding. One or more studs may be integrated into the insert (e.g., having a base that may have apertures defined therein, which is located within or on a surface of the fibrous insert and which has a post (e.g., a threaded post) that extends outward from the base). One or more metallic panels, sheets, or pieces may be integrated into the insert or secured thereto, such as for providing localized reinforcement.

One or more structural features may be incorporated into the insert (or other composite material) via selective heating, which may be conductive heating. In accordance with the present teachings there is envisioned that one or more assemblies may be made by selectively heating a portion of a structure having a wall (e.g., an outer wall of the fibrous insert) with a thickness to elevate at least a portion of the thickness of the wall to a temperature above the glass transition temperature of a polymer (e.g., a polyamide and/or a reform able resin material as taught herein, which may be reinforced as described herein, such as with a fiber or other phase) that forms the wall. While the at least a portion of the thickness of the was is above the glass transition temperature of the polymer that forms the wall, an article is contacted with the structure at least partially within the heated region, optionally under pressure. Thereafter, upon heat leaving the treated region, the polymer that forms the wait cools so that resulting polymer in contact with the article is cooled below the glass transition temperature. An adhesive bond thereby results, with the article remaining attached to the structure by way of the bond. The above method may be employed to form an adhesive bond either with or without an additional applied adhesive. That is, it may be possible that the material of the structure, when heated above its $T_g$, and then cooled below it, will be capable of forming an adhesive bond directly with the contacted article. Moreover, the tenacity of the bond may be sufficient so as to obviate the need for any fastener for securing the article to the structure. One option for achieving a bonded assembly in accordance with the above may be to employ an adhesive layer, wherein the adhesive layer (e.g., having a thickness below about 5 mm, 4 mm, or 3 mm, and above about 0.05, 0.1 or about 0.5 mm) is made of a reformable resin material as described herein.

The structure may be any of a number of suitable forms. For example, it may be an elongated beam. It may have a length and may be solid along all or part of the length. It may have a length and be hollow along all or part of the length. The structure may have a wall thickness, measured from a first exposed surface to a generally opposing exposed surface. The wall thickness may be at least about 0.5 mm, about 1 mm, about 2 mm, about 5 mm, about 10 mm, or about 20 mm. The wall thickness may be below about 100 mm, below about 80 mm, below about 60 mm, or below about 40 mm.

The structure may have a predetermined shape. The shape may include one or more elongated portions. The shape may include one or more hollow portions. The shape may include one or more walls that define at least one cavity. The structure may include a plurality of portions each having a different shape. The structure may be configured to define a fascia, which optionally may be supported by an underlying structure. The structure may be configured to define a support that underlies a fascia. The structure may have a panel configuration, e.g., a configuration that resembles a transportation vehicle (e.g., an automotive vehicle) exterior body or interior trim panel.

The structure may be configured to receive and support one or a plurality of articles (e.g., transportation vehicle components), such as for forming a module. By way of illustration the one or more articles may be selected from a bracket, a hinge, a latch, a plate, a hook, a fastener (e.g., a nut, a bolt or otherwise), a motor, a component housing, a wire harness, a drainage tube, a speaker, or otherwise.

Heat may be applied in any suitable way. One approach may be to employ localized heating. For example, it is possible to employ induction heating for selectively heating at least a portion of the above-described structure. To illustrate, it is possible that the structure will be made with a polymer (e.g., a polyamide and/or a reformable resin material as taught herein, which may be reinforced as described herein, such as with a fiber or other phase), and will have a wall thickness. A metallic item (which may be a component desired to be attached to the structure) may be brought into proximity (which may or may not be in contacting relation) with the structure at the desired location of attachment. An induction heating device may be brought into proximity with the metallic item for heating the metallic item, which in turn will heat the structure in the affected location when power is supplied to the induction heating device. Other heating devices may be employed as well for achieving localized heating.

It is possible that time that elapses from the time the structure is initially heated until when an abide becomes attached to it by the above steps may be relative short. For example, the operation may take less than about 1 minute, less than about 30 seconds, or less than about 15 seconds. It may take as low as about 1 second, about 3 seconds, or about 5 seconds.

Another approach to forming an assembly in accordance with the present teachings envisions forming a shaped part by heating a of mass material in accordance with the teachings (e.g., a polyamide and/or a reformable resin material as taught herein, which may be reinforced as described herein, such as with a fiber or other phase) to a temperature above the $T_g$ of the material. When at least a portion of the material is above the $T_g$, pressure may be applied to the mass of material to define a configured part. For example, it may be thermoformed, molded, or otherwise shaped. The configured part may then be joined with another part to form an assembly. The joinder of parts may be by an adhesive bond, by a mechanical connection (e.g., using a fastener, using a lifted joint configuration, or both), or both. For example, without limitation, at least two generally complementary parts may be secured to each other, if one of the parts is made with a reformable resin material as taught herein, they may be joined together by attaching the parts while at least a portion of that part is above the $T_g$ of the reformable resin material, and then cooling to a temperature below the $T_g$. Optionally, this approach may be modified to include the employment of a layer of adhesive between the parts, wherein the adhesive layer (e.g., having a thickness below about 5 mm, 4 mm, or 3 mm, and above about 0.05, 0.1 or about 0.5 mm) is made of a reformable resin material as described herein.

The parts may include dissimilar materials. For example, one part may include a reformable resin material of the present teachings. The other part may include a polyurethane, a polyolefin (e.g., a polypropylene), a polyamide, an acrylate, a methacrylate, a polycarbonate, a polyester, or any combination thereof; the other part may include a thermoset material; the other part may be made form a sheet molding compound or by reaction injection molding.

As indicated the fibrous inserts may have a predetermined shape. The shape may be the result of one or more calculations performed during a step of computer simulation of a crash, a certain stress state or otherwise, and may be selected so as to provide additional localized reinforcement in a predetermined region of the part that will ha subjected to a predicted stress condition that is determined from such calculations. The fibrous inserts herein may include one or any combination of a generally sinusoidal geometry over some of all of its length, a pair of spaced apart walls that are joined together by a cross wall, one or more ledges and/or steps, a concave surface portion, a convex surface region, or one or mere apertures. As indicated, the fibrous inserts herein may have a three dimensional configuration, in contrast with a generally planar configuration.

The characteristics of the insert can vary from application to application. One benefit of the present teachings is that the layers of the insert can be selected to meet the needs of a particular application (e.g., in response to modeling by computer simulation (such as computer crash or stress state simulation)). The insert can be individually built up to include a plurality of layers based upon the performance demanded by the application. Moreover, another benefit of the teachings herein is that localized reinforcement can be achieved by locating the inserts in particular locations that are indicated as requiring additional local reinforcement (e.g., in response to modeling by computer simulation (such as computer crash or stress state simulation)). The teachings herein thus afford the skilled person with a surprisingly expanded ability to selectively tune performance of structural reinforcements. The teachings also contemplate the use of modeling by computer simulation to determine the location at which a carrier is expected to carry a predetermined load in a crash or under a certain stress state. Based upon the results of such modeling, the location at which a fibrous insert should be located can be determined. Also, based upon the results of such modeling, the orientation of fibers and/or the selection of respective adjoining layers of tape or sheet in a fibrous insert can be ascertained. Parts can thereafter be made that are based upon the designs resulting from such modeling. Methods employing such steps are thus within the present teachings as well.

The carriers of the structural reinforcements may be such that the outer surface of the fibrous insert is generally co-extensive with the outer surface of the mass of polymeric material. This may be over some or all of the perimeter of the fibrous insert. It is also envisioned that the fibrous insert may have opposing surfaces that are each exposed and thus visible in the resulting part. For instance, the fibrous insert may have an exposed outer surface and an exposed inner surface. Thus, the fibrous insert may adjoin the mass of polymeric material only along one or more side edges of the fibrous insert. The resulting visible surfaces of the carrier may be substantially free of knit lines or other imperfections that could provide a source of localized weakening of the carrier.

The second polymeric may be applied directly onto the fibrous insert. The second polymeric material may be a liquid poured onto the fibrous insert until the insert is saturated with the second polymeric material. The liquid absorbed by the fibrous insert may account for at least about 30% and less than about 70% of the total weight of the insert after saturation. The saturated insert may polymerize at room temperature or with the addition of heat, such that a rigid solid composite is formed. The resulting composite may then receive the first polymeric material by locating the composite into a tool and molding the first polymeric material (which may be a nylon material) about the composite.

As appreciated from the above, the carrier may have (i) a polymeric portion defined by the mess of first polymeric material, (ii) a localized reinforcement portion defined by the at least one fibrous insert, and (iii) an interface portion between the polymeric portion and the localized reinforcement portion wherein the polymeric portion, the interface portion and the localized reinforcement portion are a generally continuous structure. The interface portion may include (i) an interpenetrating network defined by the first and second polymeric materials, (ii) chemical bonds between the first and second polymeric materials, or both (i) and (ii).

One or more sides of the activatable material may be tacky. Though it is also possible that one or more sides will be generally tack free to the touch at room temperature. One or more mechanical fasteners may be employed by attaching to or being formed integral with the activatable material, the carrier, or both.

Suitable materials that may be employed for the activatable material include expandable materials and materials that do not expand. However, it is contemplated that the activatable material can be activated to form a foam. For instance, the material may be activated to form a structural foam (e.g., the material may include an epoxy ingredient). The material may be activated to form an acoustic foam. The material may be activated to flow for purposes of sealing a region within a cavity. The material may include a combination of a material that is activatable to expand and a material that is not activatable to expand.

The structural reinforcement of the present teachings may be employed for structurally reinforcing an article, such as by locating the structural reinforcement within a cavity of the article and activating the activatable material so that it expands and bonds to a surface of the article. The structural reinforcement may also be employed to seal and/or baffle the cavity. In a preferred application, the structural reinforcement is employed to reinforce a transportation vehicle, such as an automotive vehicle.

By way of example, the structural reinforcement may be positioned within a cavity of a transportation vehicle (e.g., an automotive vehicle) prior to coating the vehicle. The activatable material may be activated when subjected to heal during paint shop baking operations. In applications where the activatable material is a heat activated, thermally expanding material, an important consideration involved with the selection and formulation of the material comprising the activatable material is the temperature at which a material reaction or expansion, end possibly curing, will take place. For instance, in most applications, it is undesirable for the material to be reactive at room temperature or otherwise at the ambient temperature in a production line environment. More typically, the activatable material becomes reactive at higher processing temperatures, such as those encountered in an automobile assembly plant, when the material is processed along with the automobile components at elevated temperatures or at higher applied energy levels, e.g., during paint or e-coat curing or baking steps. While temperatures encountered in an automobile assembly operation may be in the range of about 140° C. to about 220° C., (e.g., about 148.89° C. to about 204.44° C. (about 300° F. to 400° F.)), body and paint shop applications are commonly about 93.33° C. (about 200° F.) or slightly higher. Following activation of the activatable material, the material will typically cure. Thus, it may be possible that the activatable material may be heated, it may then expand, and may thereafter cure to form a resulting foamed material.

As indicated, the teachings herein also relate to a method for making a carrier for an activatable material (e.g., for structural reinforcement for an article). The method may include a step of inserting at least one fibrous insert (which may be consolidated at the time of the step of inserting) having an outer surface and including at least one elongated fiber arrangement into a cavity of a tool. A mass of polymeric material may be molded in contact with the fibrous insert so that a resulting molded mass of polymeric material integrally adjoins the fibrous insert (which is consolidated in its final state) and the outer surface of the fibrous insert is at least partially co-extensive and continuous with the outer surface of the resulting molded mass of polymeric material. A mass of activatable material may be applied (e.g., overmolded, mechanically attached or otherwise) selectively over at least a portion of one or both of the outer surface of the resulting mass of the polymeric material or the fibrous insert. Consistent with the teachings above, the mass of activatable material may be capable of activation for expansion by an external stimulus (e.g., to at least partially, if not completely, fill a gap or a cavity) and may be capable of curing to form an adhesive bond to at least one surface of the article to which it is attached.

The method may include a step of at least partially shaping the fibrous insert after it is placed in the cavity of the tool. For example, the tool may be preheated to a temperature above the softening temperature and/or the melting temperature of a polymer of the at least one fibrous insert prior to placing Use fibrous insert in the cavity of the tool. The method may include a step of at least partially shaping the fibrous insert after it is placed in the cavity of the tool and while molding the mass of polymeric material. For instance, heat and/or pressure that results from introducing the mass of polymeric material into the cavity (e.g., by injection molding), may at least partially cause the fibrous insert to assume a shape dictated by one or more of the walls defining the cavity. Thus it is possible that the fibrous insert is not preformed prior to placement in the cavity, and it assumes its final shape only while in the cavity. Of course, it is also possible that the fibrous insert is preformed prior to placement in the cavity.

The fibrous insert, prior to the inserting step, may be provided in the form of one or more layers of a tape and/or sheet, in which the fibers may be fixed in position relative to each other (e.g., as a result of consolidation, by which a cohesive mass of the fibers distributed in a continuous polymeric matrix is formed). The method may thus include a step of fabricating the fibrous insert to include a plurality of layers of tape and/or sheet. For example, the method includes a step of consolidating a plurality of layers of tape and/or sheet while the plurality of layers is subjected to heat and optionally an elevated pressure. For instance, a temperature may be employed that is above the melting and/or softening point of the polymer of the tape and/or sheet to cause two or more adjoining layers to fuse and remain joined together upon cooling. A pressure of about 0.1 to about 1 MPa may be applied (e.g., about 0.2 to about 0.6 MPa). The temperature and pressure may be employed for a desired amount of time to achieve essentially complete densification. It will be appreciated that the teachings afford for the formation of various consolidated insert structures.

The fibrous insert may be thermoformed to form a predetermined shape. The fibrous insert may be thermoformed during a step of consolidating. A resulting thermoformed fibrous insert may thereafter be placed in a tool cavity and molten thermoplastic polymeric material may be introduced in contact with it.

The step of molding may include a step of introducing molten polymeric material into the tool cavity by way of a gate that is positioned in generally opposing relationship with the at least one fibrous insert. In this manner, upon introduction into the cavity, the molten polymer contacts the fibrous insert before it contacts a wall defining the cavity.

Carriers made in accordance with the present teachings may have a wall having a first surface and a generally apposing second surface. The wall may have a thickness ranging from about 0.2 to about 6 mm (e.g., about 1.5 to about 4 mm). At select regions within a carrier, it is possible that at least about 20%, 40%, 60%, 80% or even 100% of the wall thickness is defined by the fibrous insert or overlay. The fibrous insert or overlay may have a contoured outer surface portion that is visibly exposed on the carrier. The fibrous insert or overlay may have a generally flat outer surface portion that is visibly exposed on the carrier. The first surface and the second surface may be generally parallel to each other.

The fibrous insert or overlay may occupy at least about 10%, 20%, 30% or even 40% by weight of the overall carrier. The fibrous insert or overlay may be less than about 90%, 80%, or even 70% by weight of the overall carrier.

Thus it is possible that at least a portion of the first surface and the second surface are each visibly exposed and will be composed of the fibrous insert or overlay. The carriers may have one or more additional structural reinforcements or other structural features, such as one or more ribs, bosses or otherwise. These features may be free of or they may include a fibrous insert in accordance with the present teachings.

If is contemplated that the materials as disclosed herein may be paintable. Paintability may be desirable, for example, if any surface is visibly exposed. The material may be ink jet printed. The material may be painted with conventional e-coat systems. The material may be paintable, as it may have an affinity for taking paint. This may be due, at least in part, to the polarity of the material and/or the hydroxyl functionality of the backbone (e.g., generally linear backbone polymer chain).

Parts herein may be employed for any of a number of purposes. For example, they may be employed to structurally reinforce a transportation vehicle such as an automotive vehicle. In this regard, a part may be placed in a cavity of a vehicle body structure, such as a vehicle frame. After applying an e-coat layer to the vehicle body (e.g., within the cavity), the part may be subjected to heat from a bake oven, which causes the activatable material to activate (e.g., expand and fill the cavity), and become bonded to the vehicle body.

FIGS. 1-11 illustrate examples in accordance with the present teachings. With reference to FIG. 1, there is seen a carrier 10 that has one or more masses 12 of a first polymeric material. A fibrous insert 14 is shown joined to the one or more masses along an edge of the insert. An interface portion 16 is depicted (in exaggerated form for purposes of illustration; for simplicity such interface is omitted from the remaining drawings, though it should be appreciated that it may still exist in such embodiments). The carrier has an upper surface 18 and a lower surface 20. The fibrous insert 14 spans from the upper surface to the lower surface so that the fibrous insert is exposed visibly top and bottom. FIG. 1 omits any activatable material. However, activatable material can be located over either or both of the mass 12 or the fibrous insert 14.

Figure 2:
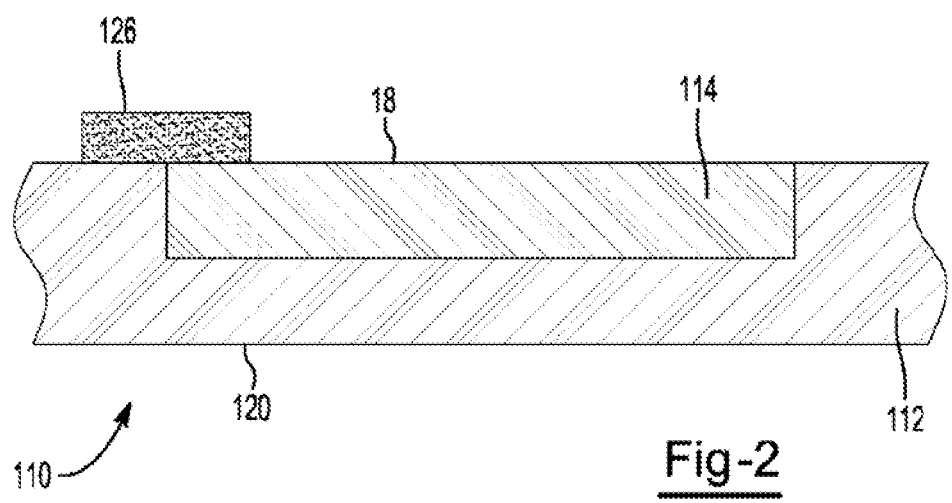
FIG. 2 is a side sectional view of a portion of another illustrative part in accordance with the present teachings.

FIG. 2 depicts a carrier 110 having a mass of polymeric material 112 and a fibrous insert 114, in which only the upper surface of the fibrous insert is exposed. A lower surface and side edges adjoin the mass of polymeric material. The interface region is omitted in this depiction, though it may be present. In this drawing, an expandable material 126 is located over both the mass of the polymeric material and the fibrous insert. However, it can be located over one or the other as well.

Figure 3:
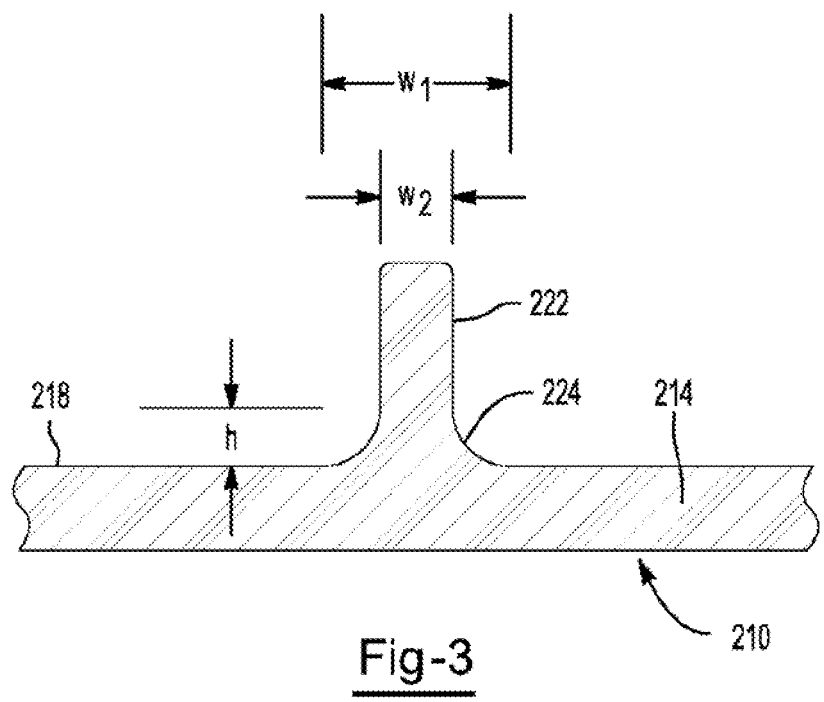
FIG. 3 is a side sectional view of a portion of yet another illustrative part in accordance with the present teachings.

FIG. 3 illustrates an example of a carrier 210 having a fibrous reinforcement portion 214 with an upper surface 218, from which a rib 222 projects, which is made of a mass of polymeric material (e.g., the same type of material as is otherwise present in the carrier to which the insert adjoins). The rib includes an outwardly projecting portion having a width $w_1$, and an enlarged neck region that has a width (at its largest dimension) $w_2$ that is larger than the width $w_1$, such as by an amount of at least about 10%, 20% or 30%. The width $w_2$ may be larger than the width $w_1$, such as by an amount of no greater than about 100%, 80% or 60%. A similar rib structure can be employed in the embodiment of FIG. 2.

Figures 4A, 4B:
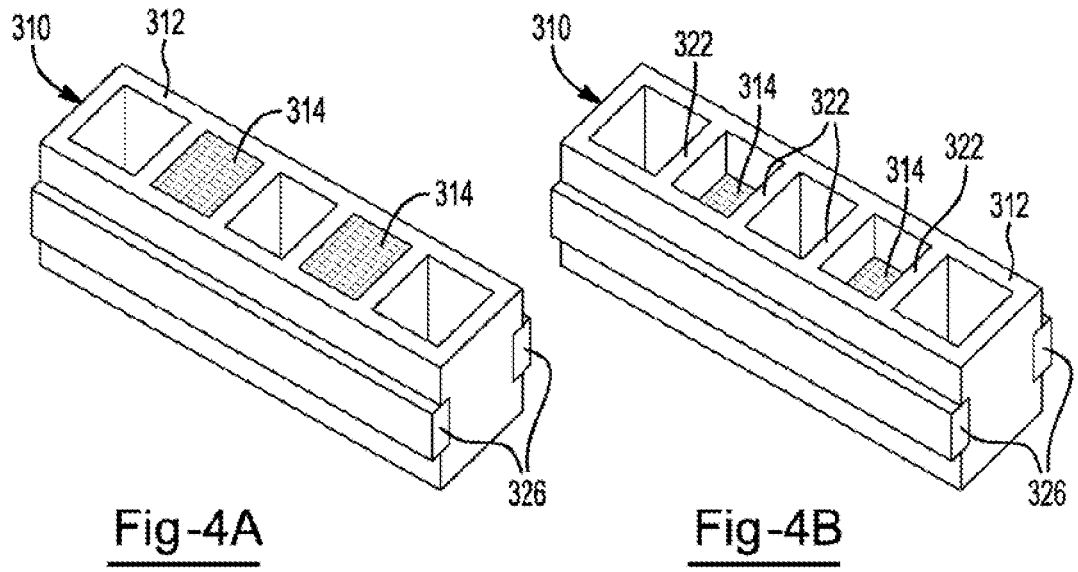

FIGS. 4a and 4b illustrate two views of an illustrative carrier 310 that includes a mass of polymeric material 312 and a pair of fibrous inserts 314. In this instance the fibrous inserts have upper and lower surfaces that are exposed. Though it is possible to employ a structure like in FIG. 2, in which only an upper surface is exposed. A plurality of ribs 322 are employed (ribs are shown in transverse disposition relative to a longitudinal axis (however for all of the embodiments herein, ribs may run longitudinally, transverse, diagonally, or any combination thereof; ribs may also be arcuate)). An activatable material 328 is shown. Though shown in a groove, it may rest on an outer surface or otherwise be carried on the carrier for all of the embodiments herein.

Figure 5:
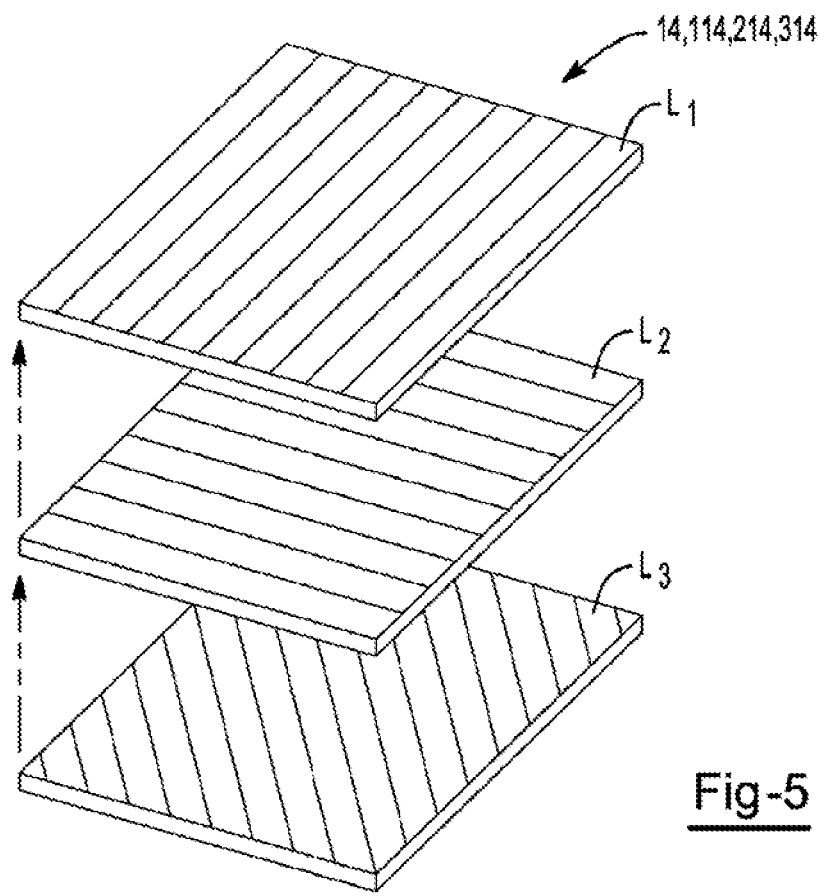
FIG. 5 is an exploded perspective view of one illustrative lay-up of a fibrous insert of the present teachings.

FIG. 5 illustrates an example of how fibrous inserts 14, 114, 214 or 314 can have multiple layers with two or more adjoining layers having different fiber orientations. Though shown as unidirectionally oriented in this example, strips of impregnated fibers may also be provided as a woven layer. Other orientations than those disclosed in FIG. 5 are possible. For example three layers of uniaxially oriented fibers may be oriented at 0/90/0 degrees relative to each other, or five layers may be oriented at 0/45/90/45/0 degrees relative to each other. Other orientations are also possible.

FIGS. 6a and 6b illustrate an example of one part in accordance with the present teachings. The part includes a carrier 610 that is shown as a molded part. It includes a fibrous insert 614. The carrier includes a plurality of ribs 622. Activatable material 626 is applied over a portion of the carrier, and is shown as partially covering the insert 614. The insert 614, which is overmolded for defining the carrier 610, includes an arcuate surface, and specifically a concave surface portion 640. In the embodiment shown, it is located toward an end of the insert 614. The insert 614 also includes a through-hole aperture 642. The insert includes a pair of opposing walls 644 (which may be generally parallel or otherwise oriented) and a cross wall 646. The insert spans a central portion of the carrier.

FIGS. 7a and 7b illustrate an example of another part in accordance with the present teachings. The part includes a carrier 710 that is shewn as a molded part, it includes a fibrous insert 714. The carrier includes a plurality of ribs 722. Activatable material 726 is applied over a portion of the carrier, and is shown as partially covering the insert 714. The insert 714, which is overmolded for defining the carrier 710, includes an arcuate surface portion 740. In the embodiment shown, it is located toward an end of the insert 714. The insert 714 also includes a through-hole aperture 742. The insert includes a pair of opposing walls 744 (which may be generally parallel or otherwise oriented) and a cross wall 746. At least one step 748 is defined in the insert.

Figure 8:
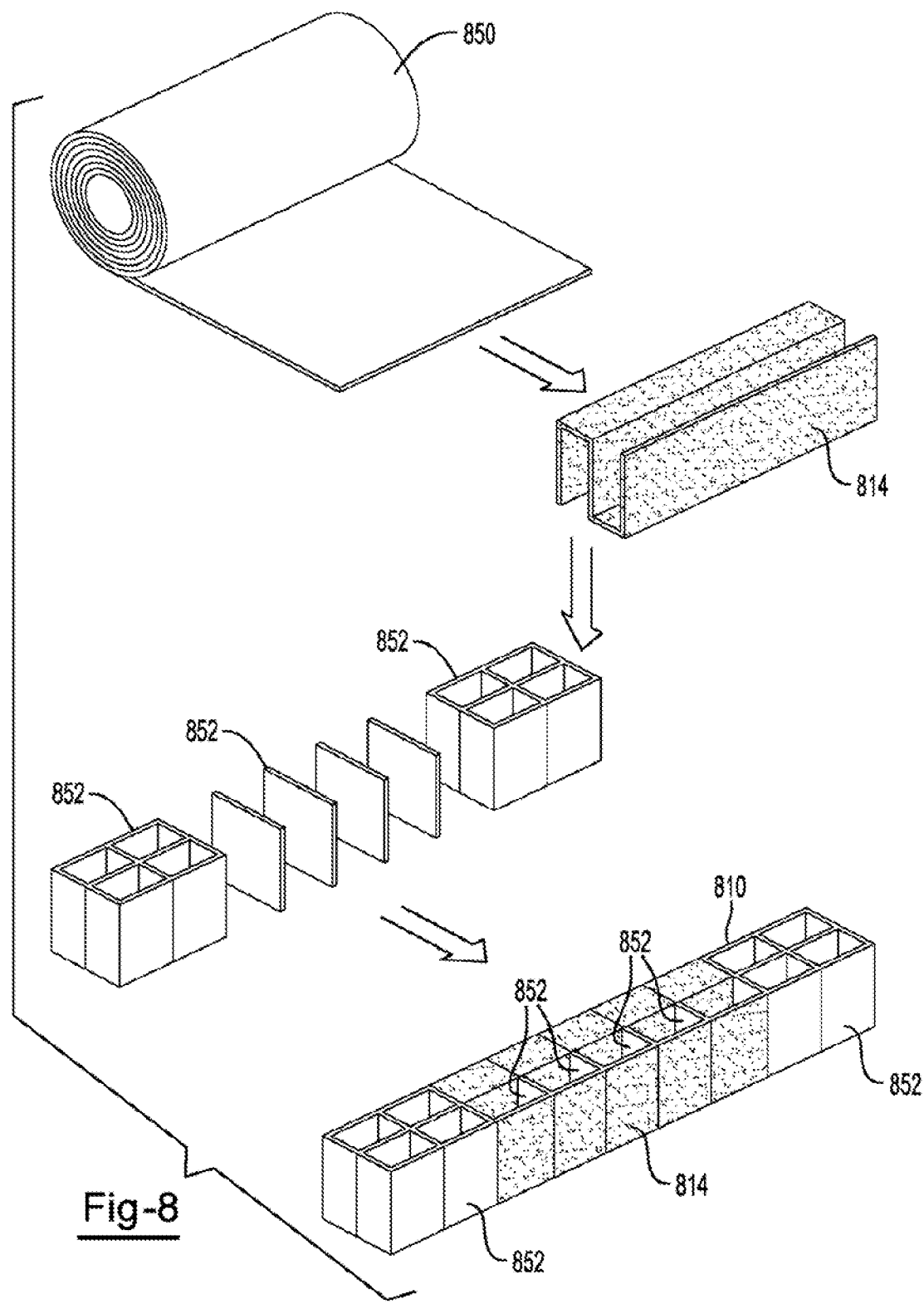
FIG. 8 is a schematic illustrating the formation of an illustrative part in accordance with the present teachings.

FIG. 8 illustrates schematically how a carrier may be made in accordance with the present teachings. A reel of fibrous material 850 may supply the material to define an insert 814, shown as being sinusoidal. The insert may be overmolded to define overmolded portions 852 (e.g., including a plurality of ribs) of a resulting carrier 810. The resulting carrier, thus includes the insert 814 and the overmolded portions 852.

FIG. 9 illustrates an example of an extruded profile in accordance with the teachings for use as a carrier 910. The profile includes a shaped (e.g., by rolling or otherwise being extruded) fibrous composite material overlay 960 over an outer surface of carrier shaped body 962 (e.g., an extruded polyamide or glass filled polyamide, such as Nylon®). The carrier shaped body 962 has an inner surface 964. A rib 966 extends away (e.g., generally orthogonally) from the inner surface 964. An activatable material A is shown. The activatable material A may have been extruded onto the carrier.

FIG. 10 illustrates an example of a possible manufacturing system 1070 that may be employed for an extrusion operation in accordance with the present teachings. Raw material for forming a base polymeric material body are fed into a hopper 1072 associated with an extruder 1074. The extruder 1074 has a die 1076 through which the raw material is passed to form a shaped body profile 1078 (e.g., an extruded profile). The shaped body prolife may be cooled (e.g., by a vacuum cooler 1080) to a desired temperature. A feed system 1082 may feed a fibrous material 1084 (e.g., by way of rollers) to a roll coater 1086 at which the material for forming a polymeric matrix is contacted with the fibrous material. A forming roller 1088 (or another suitable extrusion type shaping device) may then further define the desired shape of the resulting fibrous composite material. The forming roller may also serve to help join the fibrous composite material with the shaped base body profile. Upon joinder the resulting overall composite 1080 may be cooled (e.g., by a cooling tank 1092). Optionally, if to be employed for use as a carrier for a baffling and/or structural reinforcement application, the resulting overall composite 1090 may be advanced by a conveyor device (e.g., a putting or pushing device) 1094. An activatable malarial may be applied to the composite 1090 by an extruder 1096 (e.g., a cross head extruder). Thereafter, the resulting composite (with or without the activatable material on it) may be cut by a suitable cutting device 1098 (e.g., a traveling cut-off saw). By way of illustration, without limitation, the raw material may be a glass filled Nylon® heated to about 260° C. Upon exiting the cooler, the temperature may be about 150 to about 175° C. The fibers may be glass fibers that are roll coated with a reaction product of a monoethanolamine and diglycidyl ether of bisphenol A, while the reaction product in a softened state. Upon exiting the cooling tank the composite may be at a temperature of about 120° C. At the time of passing the extruder, the temperature may be about 90-95° C. The cross-head extruder may extrude one or more masses of a heat activatable epoxy-based structural foam, such as a structural reinforcement material in the L-55xx series, available from L&L Products, Inc. The manufacturing system may also include one or more pultrusion steps.

As shown for example at FIGS. 11A-11C, the prolife 1110 may be formed as a continuous fiber pultruded carrier 1112 including a thermoplastic epoxy material. In fact the carrier 1112 may comprise solely the thermoplastic epoxy material and may be free of any additional polymeric materials. Alternatively, only a portion of the carrier 1112 may be formed of the thermoplastic epoxy material. The carrier may further include a sealant material 1114 which may be added to the carrier, during or after the pultrusion process. The carrier may also include the addition of one or more film portions 1116. The film portions 1116 may improve bonding between dissimilar materials and/or assist in corrosion prevention, such that they may be located about and/or adjacent to one or more openings for receiving a fastener. The carrier and one or more of the attached materials referenced above may also be extruded.

It will be appreciated that, even though the embodiments of FIGS. 1 through 11 are shown separately, features of one may be combined with features of another and remain within the present teachings. The depictions therein thus should be regarded as generalized and applicable to the teachings as a whole herein.

The teachings herein are illustrated in connection with a carrier for a structural reinforcement, in which the carrier is generally elongated (e.g., it may be at least about 25 mm long, at least about 50 mm long or even at least about 100 mm long). However, the teachings are not intended to be so limiting. The teachings also contemplate their usage for forming carriers for baffling and/or sealing. The carriers may thus have lengths that are shorter than about 25 mm (e.g. about 15 mm or shorter). The carriers may be longer than they are wide. The carriers may be wider than they are long.

As can be appreciated from the teachings herein, various benefits and/or advantages may be realized. For example, parts may be prepared that have a carrier that is made of a material free of a thermosetting plastic. Parts may be prepared that have at least a portion of the activatable material located over and in contact with a fibrous insert of the present teachings.

As used herein, unless otherwise stated, the teachings envision that any member of a genus (list) may be excluded from the genus; and/or any member of a Markush grouping may be excluded from the grouping.

Unless otherwise stated, any numerical values recited herein include all values from the lower value to the upper value in increments of one unit provided that there is a separation of at least 2 units between any lower value and any higher value. As an example, if it is stated that the amount of a component, a property, or a value of a process variable such as, for example, temperature, pressure, time and the like is, for example, from 1 to 90, preferably from 20 to 80, more preferably from 30 to 70, it is intended that intermediate range values such as (for example, 15 to 85, 22 to 68, 43 to 51, 30 to 32 etc.) are within the teachings of this specification. Likewise, individual intermediate values are also within the present teachings. For values which are less than one, one unit is considered to be 0.0001, 0.001, 0.01, or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the of a range in terms of "at least 'x' parts by weight of the resulting composition" also contemplates a teaching of ranges of same recited amount of "x" in percent by weight of the resulting composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist of, or consist essentially of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the an upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

What is claimed is:

1. A device comprising:
   i. a carrier; and
   ii. a fibrous insert having at least one elongated fiber arrangement of a plurality of ordered fibers;
      wherein the fibrous insert is joined to the carrier by an interface portion, and the fibrous insert extends from an upper surface to a lower surface of the carrier; and
      wherein the at least one elongated fiber arrangement is distributed in a thermoplastic material.

2. The device of claim 1, wherein the at least one elongated fiber arrangement includes a material that is the same material as the thermoplastic material.

3. The device of claim 2, wherein the at least one elongated fiber arrangement is a woven fiber arrangement.

4. The device of claim 3, wherein the plurality of ordered fibers are glass fibers, mineral fibers, carbon fibers, polymeric fibers, or any combination thereof.

5. The device of claim 1, wherein the thermoplastic material is an epoxy-based material.

6. The device of claim 5, wherein the carrier includes ribs extending in a transverse direction relative to a longitudinal axis of the carrier.

7. The device of claim 6, wherein the fibrous insert is positioned between the ribs.

8. The device of claim 7, wherein the fibrous insert is recessed from an outer surface of the carrier.

9. The device of claim 8, wherein an activatable material is disposed over at least a portion of the carrier.

10. The device of claim 9, wherein the activatable material is free of contact with the fibrous insert.

11. The device of claim 5, wherein the fibrous insert includes a plurality of layers each having an elongated fiber arrangement oriented in a different manner.

12. The device of claim 11, wherein the device includes a polymeric material located in between and in direct planar contact with both the carrier and the fibrous insert.

13. The device of claim 12, wherein the polymeric material is a film.

14. The device of claim 13, wherein the carrier is a pultruded epoxy material.

15. The device of claim 14, wherein a sealant material is disposed on at least a portion of the carrier.

16. The device of claim 1, wherein an outer surface of the fibrous insert is positioned on top of, and is co-extensive with, an outer surface of the carrier.

17. The device of claim 16, wherein the carrier is free of knit lines or other imperfections.

18. The device of claim 17, wherein the fibrous insert is visible from both a top and a bottom of the carrier.

19. The device of claim 18, wherein the fibrous insert is inserted into the carrier and only an upper surface of the fibrous insert is exposed.

* * * * *